United States Patent
Lee et al.

(10) Patent No.: US 9,196,220 B2
(45) Date of Patent: Nov. 24, 2015

(54) THREE-DIMENSIONAL IMAGE DISPLAY APPARATUS AND METHOD OF DRIVING THE SAME

(71) Applicant: Samsung Display Co., Ltd., Yongin (KR)

(72) Inventors: Je-Yun Lee, Asan-si (KR); Yunjae Park, Seoul (KR); Choongseob Oh, Yongin-si (KR); JeongA Lee, Gwangmyeong-si (KR); Hyun-Seok Jeong, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 252 days.

(21) Appl. No.: 13/691,194

(22) Filed: Nov. 30, 2012

(65) Prior Publication Data

US 2013/0342590 A1 Dec. 26, 2013

(30) Foreign Application Priority Data

Jun. 22, 2012 (KR) .......................... 10-2012-0067443

(51) Int. Cl.
- *G09G 5/10* (2006.01)
- *G09G 3/00* (2006.01)
- *H04N 13/04* (2006.01)
- *G09G 3/36* (2006.01)

(52) U.S. Cl.
CPC .................. *G09G 5/10* (2013.01); *G09G 3/003* (2013.01); *H04N 13/0402* (2013.01); *H04N 13/0438* (2013.01); *G09G 3/36* (2013.01); *G09G 3/3648* (2013.01); *G09G 2310/061* (2013.01); *G09G 2320/0252* (2013.01); *G09G 2340/0435* (2013.01)

(58) Field of Classification Search
CPC ..... G09G 5/10; G09G 3/003; H04N 13/0402; H04N 13/0438
See application file for complete search history.

(56) References Cited

U.S. PATENT DOCUMENTS

| | | | | |
|---|---|---|---|---|
| 5,875,055 | A * | 2/1999 | Morishima et al. | 359/465 |
| 6,094,216 | A * | 7/2000 | Taniguchi et al. | 348/51 |
| 7,619,815 | B2 * | 11/2009 | Nam et al. | 359/464 |
| 2010/0238274 | A1 * | 9/2010 | Kim et al. | 348/51 |
| 2011/0050865 | A1 | 3/2011 | Seong et al. | |
| 2011/0116166 | A1 * | 5/2011 | Jung et al. | 359/465 |
| 2011/0149047 | A1 | 6/2011 | Min et al. | |
| 2011/0157161 | A1 * | 6/2011 | Choi et al. | 345/419 |

(Continued)

FOREIGN PATENT DOCUMENTS

| | | |
|---|---|---|
| JP | 2010-078985 | 4/2010 |
| KR | 10-2006-0022883 | 3/2006 |

(Continued)

*Primary Examiner* — Latanya Bibbins
(74) *Attorney, Agent, or Firm* — Cantor Colburn LLP

(57) ABSTRACT

A display apparatus includes a display panel including left-eye pixels and right-eye pixels, a three-dimensional controller which separates a first image signal into left-eye and right-eye image signals, outputs a second image signal such that the left-eye image signal is applied to the left-eye pixels during a left-eye frame, a black image signal corresponding to a black data is applied to the right-eye pixels during the left-eye frame, the black image signal is applied to the left-eye pixels during a right-eye frame, and the right-eye image signal is applied to the right-eye pixels during the right-eye frame, and an image display controller which controls the second image signal in response to a control signal, where the left-eye pixels are alternately arranged with the right-eye pixels in the unit of two pixels in a first direction and in the unit of a predetermined number of pixels in the second direction.

16 Claims, 18 Drawing Sheets

(56) References Cited

U.S. PATENT DOCUMENTS

2011/0193947 A1* 8/2011 Chen .............................. 348/56
2012/0038690 A1* 2/2012 Lee ............................... 345/691

FOREIGN PATENT DOCUMENTS

| KR | 10-2010-0095832 | 9/2010 |
|----|-----------------|--------|
| KR | 10-2011-0069483 | 6/2011 |
| KR | 10-2011-0107670 | 10/2011 |
| KR | 10-2011-0121826 | 11/2011 |
| KR | 10-2011-0126944 | 11/2011 |
| KR | 10-2011-0137664 | 12/2011 |
| KR | 10-2011-0138825 | 12/2011 |
| KR | 10-2012-0005127 | 1/2012 |
| KR | 10-2012-0007863 | 1/2012 |

\* cited by examiner

THREE-DIMENSIONAL IMAGE DISPLAY APPARATUS AND METHOD OF DRIVING THE SAME

This application claims priority to Korean Patent Application No. 10-2012-0067443, filed on Jun. 22, 2012, and all the benefits accruing therefrom under 35 U.S.C. §119, the content of which in its entirety is herein incorporated by reference.

BACKGROUND

1. Field

The present disclosure relates to a three-dimensional ("3D") image display apparatus and a method of driving the 3D image display apparatus. More particularly, the present disclosure relates to a 3D image display apparatus, in which deterioration of image display quality due to a response speed of liquid crystal is effectively prevented, and a method of driving the 3D image display apparatus.

2. Description of the Related Art

In general, a display apparatus displays a two-dimensional image. Recently, demand for a 3D image display apparatus has increased in various fields, such as movie, medical image processing, game, advertisement and education, for example, and thus the 3D image display apparatus that displays a 3D image has been researched.

The 3D image display apparatus provides the 3D image using binocular disparity between the human eyes. Since the human eyes are spaced apart and separated from each other with a distance therebetween, an object is observed at different angles by two eyes of a viewer and different images of the object are thereby transmitted to the human brain. The human brain mixes the different images with each other and perceives the 3D image.

The 3D image display apparatus is typically classified into two types, e.g., a stereoscopic type 3D display apparatus and an auto-stereoscopic type 3D display apparatus according to whether the viewer wears glasses to perceive the 3D image.

As the auto-stereoscopic type 3D display, a lenticular method and a parallax barrier method have been developed. In addition, a polarization method and a shutter glass method have been developed for the stereoscopic type 3D display apparatus.

Particularly, in the shutter glass method, a left-eye shutter and a right-eye shutter of shutter glasses are alternately opened in synchronization with a display period of a left-eye image and a right-eye image. In the 3D image display apparatus including a liquid crystal display panel, an image displayed during a present frame period exerts influence on an image displayed during a subsequent frame period such that deterioration in image display quality may occur.

SUMMARY

The present disclosure provides a three-dimensional ("3D") image display apparatus with improved image display quality.

The present disclosure provides a method of driving the 3D image display apparatus.

An exemplary embodiment of a display apparatus includes a display panel including a plurality of left-eye pixels and a plurality of right-eye pixels, a 3D controller which separates a first image signal into a left-eye image signal and a right-eye image signal, outputs a second image signal such that the left-eye image signal is applied to the left-eye pixels during a left-eye frame, a black image signal corresponding to a black data is applied to the right-eye pixels during the left-eye frame, the black image signal is applied to the left-eye pixels during a right-eye frame, and the right-eye image signal is applied to the right-eye pixels during the right-eye frame, and an image display controller which controls the second image signal in response to a control signal from an external source such that an image is displayed in the display panel based on the second image signal. In such an embodiment, the left-eye pixels are alternately arranged with the right-eye pixels in the unit of two pixels in a first direction, and the left-eye pixels are alternately arranged with the right-eye pixels in the unit of a predetermined number of pixels in a second direction.

In an exemplary embodiment, the 3D controller may output the second image signal, based on which the black image signal is applied to the left-eye pixels and the right-eye pixels during a first sub-frame between the left-eye frame and the right-eye frame and the black image signal is applied to the left-eye pixels and the right-eye pixels during a second sub-frame between the right-eye frame and the left-eye frame.

In an exemplary embodiment, the second image signal applied to the left-eye pixels during a first sub-frame between the left-eye frame and the right-eye frame may be a low gray-scale black image signal corresponding to a gray-scale level lower than a gray-scale level of the black data, and the second image signal applied to the right-eye pixels during a second sub-frame between the right-eye frame and the left-eye frame may be the low gray-scale black image signal.

In an exemplary embodiment, the second image signal applied to the right-eye pixels during the first sub-frame is a high gray-scale black image signal corresponding to a gray-scale level higher than the black data, and the second image signal applied to the left-eye pixels during the second sub-frame is the high gray-scale black image signal.

In an exemplary embodiment, the second image signal applied to the left-eye pixels may change every frame in order of the left-eye image signal, the low gray-scale black image signal, the black image signal and the high gray-scale level black image signal, and the second image signal applied to the right-eye pixels may change every frame in order of the black image signal, the high gray-scale black image signal, the right-eye image signal and the low gray-scale black image signal.

In an exemplary embodiment, the left-eye frame may include a first left-eye frame and a second left-eye frame, and the right-eye frame may include a first right-eye frame and a second right-eye frame. In such an embodiment, each of the left-eye image signal, the left-eye image signal, the low gray-scale black image signal, the low gray-scale black image signal, the high gray-scale black image signal and the high gray-scale black image signal may be applied to the left-eye pixels as the second image signal in a corresponding frame of the first left-eye frame, the second left-eye frame, the first sub-frame, the first right-eye frame, the second right-eye frame and the second sub-frame, and each of the low gray-scale black image signal, the high gray-scale black image signal, the high gray-scale black image signal, the right-eye image signal, the right-eye image signal and the low gray-scale black image signal may be applied to the right-eye pixels as the second image signal in a corresponding frame of the first left-eye frame, the second left-eye frame, the first sub-frame, the first right-eye frame, the second right-eye frame and the second sub-frame.

In an exemplary embodiment, the 3D controller may include a frame rate converter which separates the first image signal into the left-eye image signal and the right-eye image signal, and a data converter which outputs the second image signal such that the left-eye image signal may be applied to the left-eye pixels during the left-eye frame, the black image signal may be applied to the right-eye pixels during the left-eye frame, the black image signal may be applied to the left-eye pixels during the right-eye frame, and the right-eye image signal may be applied to the right-eye pixels during the right-eye frame.

In an exemplary embodiment, the frame rate converter and the data converter may operate in response to a mode signal which indicates a 3D display mode.

In an exemplary embodiment, the 3D controller may include a frame rate converter which separates the first image signal into the left-eye image signal and the right-eye image signal, a first calculator which generates a low gray-scale black image signal of a present frame based on the left-eye image signal of a previous frame or the right-eye image signal of the previous frame, a second calculator which generates a high gray-scale black image signal of the present frame based on the left-eye image signal of the previous frame or the right-eye image signal of the previous frame, and a data converter which outputs the second image signal such that the left-eye image signal is applied to the left-eye pixels during the left-eye frame, the black image signal is applied to the right-eye pixels during the left-eye frame, the black image signal is applied to the left-eye pixels during the right-eye frame, and the right-eye image signal is applied to the right-eye pixels during the right-eye frame. In such an embodiment, the data converter may output the low gray-scale black image signal to the left-eye pixels as the second image signal during a first sub-frame between the left-eye frame and the right-eye frame and may output the high gray-scale black image signal to the right-eye pixels as the second image signal during the first sub-frame.

In an exemplary embodiment, the data converter may output the high gray-scale black image signal to the left-eye pixels as the second image signal during a second sub-frame between the right-eye frame and the left-eye frame and may output the low gray-scale black image signal to the right-eye pixels as the second image signal during the second sub-frame.

In an exemplary embodiment, the image display controller may include a data driver which drives a plurality of data lines connected to the left-eye pixels and the right-eye pixels, a gate driver which drives a plurality of gate lines connected to the left-eye pixels and the right-eye pixels, and a timing controller which converts the second image signal from the 3D controller to a third image signal in response to the control signal and controls the data driver and the gate driver such that the third image signal is displayed in the left-eye pixels and the right-eye pixels.

In an exemplary embodiment, the display apparatus may further include, a plurality of light source groups arranged opposite to the light-eye pixels and the right-eye pixels, where the gate lines are grouped into a plurality of groups of gate lines, and each of the light source groups corresponds to a gate line group of the gate line groups. In such an embodiment, each of the light source groups may be sequentially enabled when the left-eye pixels connected to a corresponding gate line group of the gate line groups are driven in response to a voltage corresponding to the left-eye image signal by the data driver or when the right-eye pixels connected to a corresponding gate line group of the gate line groups are driven in response to a voltage corresponding to the right-eye image signal by the data driver.

In an exemplary embodiment, each of the light source groups may be sequentially disabled when the left-eye pixels connected to the corresponding gate line group of the gate line groups are driven in response to a voltage corresponding to the low gray-scale black image signal by the data driver or when the right-eye pixels connected to the corresponding gate line group of the gate line groups are driven in response to the voltage corresponding to the low gray-scale black image signal by the data driver.

An exemplary embodiment of a method of driving a display apparatus, which displays an image based on a three-dimensional image signal, includes separating a first image signal into a left-eye image signal and a right-eye image signal, applying the left-eye image signal to the left-eye pixels during a left-eye frame and applying a black image signal corresponding to a black data to the right-eye pixels during the left-eye frame, and applying the black image signal to the left-eye pixels during a right-eye frame and applying the right-eye image signal to the right-eye pixels during the right-eye frame. In such an embodiment, the left-eye pixels are alternately arranged with the right-eye pixels in the display apparatus in the unit of two pixels in a first direction, and the left-eye pixels are alternately arranged with the right-eye pixels in the display apparatus in the unit of a predetermined number of pixels in a second direction.

In an exemplary embodiment, the method may further include applying the black image signal to the left-eye pixels and the right-eye pixels during a first sub-frame between the left-eye frame and the right-eye frame, and applying the black image signal to the left-eye pixels and the right-eye pixels during a second sub-frame between the right-eye frame and the left-eye frame.

In an exemplary embodiment, the method may further include applying a low gray-scale black image signal corresponding to a gray-scale level lower than a gray-scale level of the black data to the left-eye pixels during a first sub-frame between the left-eye frame and the right-eye frame, and applying the low gray-scale black image signal to the right-eye pixels during a second sub-frame between the right-eye frame and the left-eye frame.

In an exemplary embodiment, the method further includes applying a high gray-scale black image signal corresponding to a gray-scale level higher than the gray-scale level of the black data to the right-eye pixels during the first sub-frame and applying the high gray-scale black image signal to the left-eye pixels during the second sub-frame.

In an exemplary embodiment, the method may further include generating the low gray-scale black image signal of a present frame based on the left-eye image signal of a previous frame or the right-eye image signal of the previous frame, and generating the high gray-scale black image signal of the present frame based on the left-eye image signal of the previous frame or the right-eye image signal of the previous frame.

According to one or more exemplary embodiments, the pixels of the display panel are divided into the left-eye pixels, in which the left-eye image is displayed, and right-eye pixels, in which the right-eye image is displayed, and the left-eye image signal is applied to the left-eye pixels and right-eye image signal is applied to the right-eye pixels such that a crosstalk phenomenon is substantially reduced or effectively prevented when the falling time of the liquid crystal response is substantially long. In such an embodiment, the high gray-scale black image signal and the low gray-scale signal are applied to the display panel during the first and second sub-frames in which the black image is displayed, and thus the falling time of the liquid crystal response is substantially reduced. Thus, in such an embodiment, the image display quality of the 3D image is substantially improved.

BRIEF DESCRIPTION OF THE DRAWINGS

The above and other features of the invention will become readily apparent by reference to the following detailed description when considered in conjunction with the accompanying drawings wherein.

DETAILED DESCRIPTION

Figure 1:
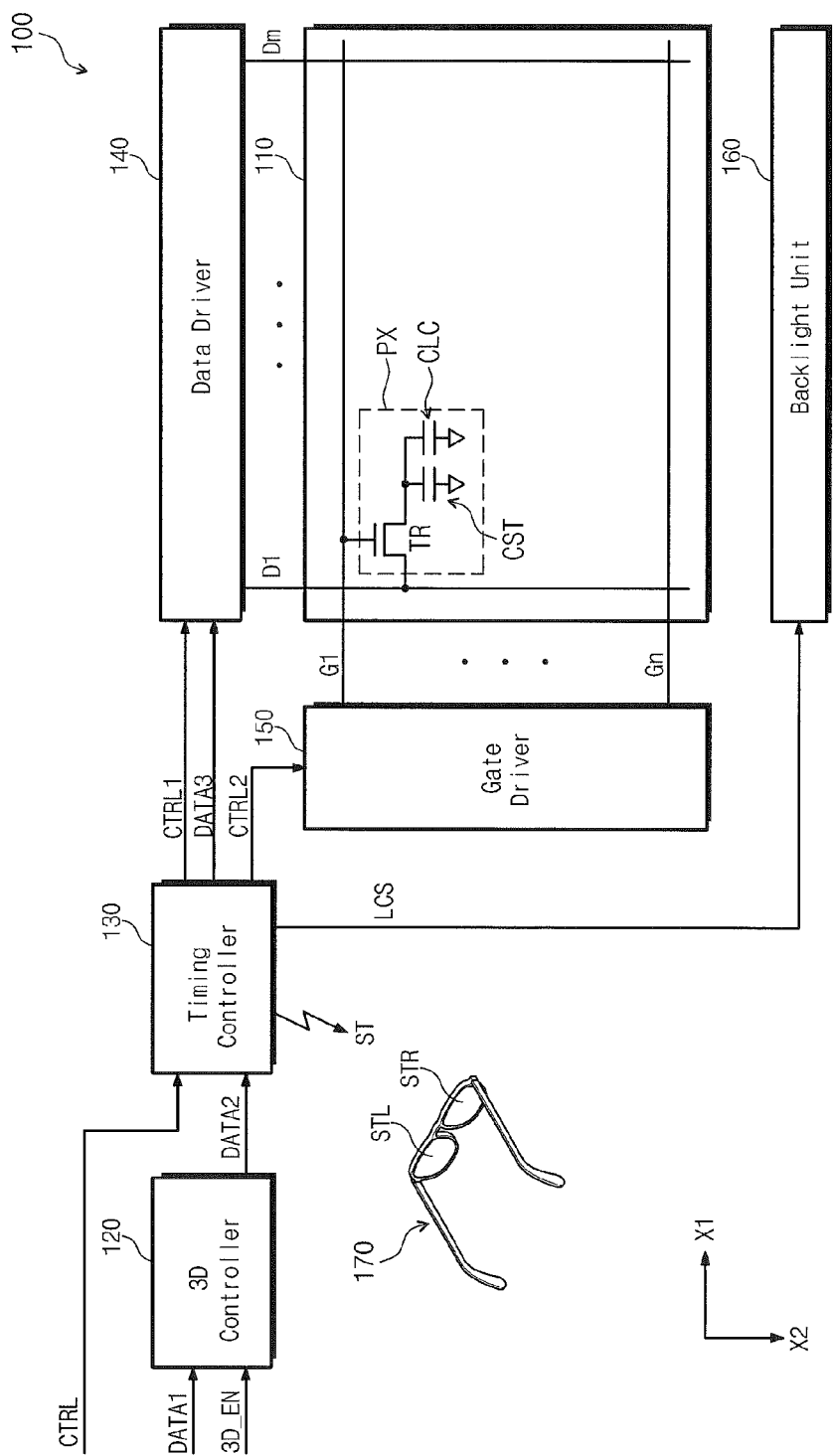
FIG. 1 is a block diagram showing an exemplary embodiment of a display apparatus according to the invention.

The invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in detail with reference to the accompanying drawings.

FIG. 1 is a block diagram showing an exemplary embodiment of a display apparatus according to the invention.

Referring to FIG. 1, a display apparatus 100 includes a display panel 110, a three-dimensional ("3D") controller 120, a timing controller 130, a data driver 140, a gate driver 150 and a backlight unit 160. The display apparatus 100 further includes shutter glasses 170. The timing controller 130, the data driver 140 and the gate driver 150 serve as an image display controller to display an image on the display panel 110.

The display panel 110 displays the image. The display panel 110 may be, but not limited to, a liquid crystal display panel, an organic light emitting display panel, an electrophoretic display panel or an electrowetting display panel, for example. In FIG. 1, an exemplary embodiment where the display panel 110 is the liquid crystal display panel is shown for convenience of illustration.

The display panel 110 includes a plurality of gate lines, e.g., first to n-th gate lines G1 to Gn, extending in a first direction X1, a plurality of data lines, e.g., first to m-th data lines D1 to Dm, extending in a second direction X2 and crossing the gate lines G1 to Gn, and a plurality of pixels PX arranged in the display panel 110. In one exemplary embodiment, for example, the pixels PX may be disposed in areas defined by the gate lines G1 to Gn and the data lines D1 and Dm. The data lines D1 to Dm are insulated from the gate lines G1 to Gn. Each of the pixels PX includes a thin film transistor TR, a liquid crystal capacitor CLC and a storage capacitor CST.

The pixels PX have substantially the same structure and function as each other, and thus one pixel will be described in detail for convenience of description and the detailed description of the other pixels will be omitted. The thin film transistor TR includes a gate electrode connected to a corresponding gate line, e.g., a first gate line G1, of the gate lines G1 to Gn, a source electrode connected to a corresponding data line, e.g., a first data line D1, of the data lines D1 to Dm, and a drain electrode connected to a storage capacitor CST connected to the liquid crystal capacitor CLC and the storage capacitor CST. A first end of each of the liquid crystal capacitor CLC and the storage capacitor CST is connected to the drain electrode in parallel and a second end of the liquid crystal capacitor CLC and the storage capacitor CST is connected to a common voltage.

The pixels PX include pixels for a left eye (hereinafter, referred to left-eye pixels) and pixels for a right eye (hereinafter, referred to right-eye pixels).

Figure 2A:
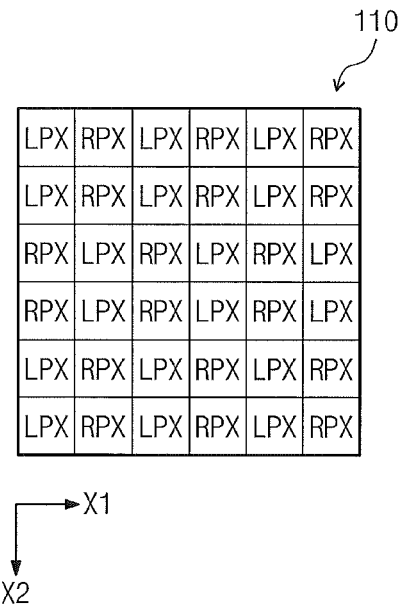
FIGS. 2A and 2B are views showing an exemplary embodiment of an arrangement of pixels for a left eye and pixels for a right eye in the display panel shown in FIG. 1.
Figure 2B:
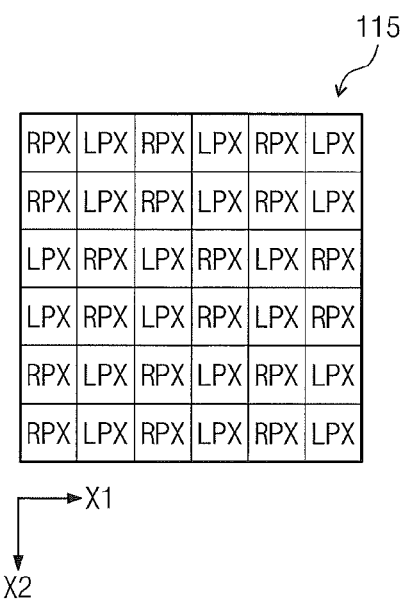

FIGS. 2A and 2B are views showing an exemplary embodiment of arrangements of pixels for a left eye and pixels for a right eye in a display panel shown in FIG. 1.

Referring to FIG. 2A, in an exemplary embodiment, the left-eye pixels LPX are alternately arranged with the right-eye pixels RPX in the unit of two pixels in the second direction X2 of the display panel 110, and the left-eye pixels LPX are alternately arranged with the right-eye pixels RPX in the unit of one pixel in the first direction X1 of the display panel 110.

Referring to FIG. 2B, in an alternative exemplary embodiment, the right-eye pixels RPX are alternately arranged with the left-eye pixels LPX in the unit of two pixels in the second direction X2 of the display panel 110, and the right-eye pixels RPX are alternately arranged with the left-eye pixels LPX in the unit of one pixel in the first direction X1 of a display panel 115.

As shown in FIGS. 2A and 2B, the arrangement of the left-eye pixel LPX and right-eye pixel RPX in an exemplary embodiment of the display panel 110 of FIG. 2A is different from the arrangement of the left-eye pixel LPX and right-eye pixel RPX in an exemplary embodiment of the display panel 115 of FIG. 2B. Hereinafter, for the convenience of description, an operation of the display apparatus 100 will be described with reference to the arrangement of the left-eye pixel LPX and right-eye pixel RPX in the display panel 110.

Referring to back FIG. 1, the 3D controller 120 converts a first image signal DATA1 from an external source (not shown) to a second image signal DATA2 in response to a 3D mode signal 3D_EN. During a 3D display mode, the 3D controller 120 separates the first image signal DATA1 into a left-eye image signal L and a right-eye image signal R, outputs the second signal DATA2 to allow the left-eye image signal L to be applied to the left-eye pixels LPX and a black image signal B corresponding to black data to be applied to the right-eye pixels RPX in a left-eye frame, and outputs the second image signal DATA2 to allow the black image signal B to be applied to the left-eye pixels LPX and a right-eye image signal R to be applied to the right-eye pixels RPX. In such an embodiment, based on the second signal DATA2, the left-eye image signal L is applied to the left-eye pixels LPX and a black image signal B corresponding to black data is applied to the right-eye pixels RPX in a left-eye frame, the black image signal B is applied to the left-eye pixels LPX, and a right-eye image signal R is applied to the right-eye pixels RPX. The second image signal DATA2 output from the 3D controller 120 may correspond to the arrangements of the left-eye pixels LPX and the right-eye pixels RPX in the display panel 110 and a display frequency. The configuration and operation of the 3D controller 120 will be described later in greater detail.

The timing controller 130 receives the second image signal DATA2 from the 3D controller 120 and control signals CTRL from an external source (not shown), such as a vertical synchronization signal, a horizontal synchronization signal, a main clock signal and a data enable signal, for example. The timing controller 130 processes the second image signal DATA2 based on the control signals CTRL to output a third image signal DATA3, applies the third image signal DATA3 and a first control signal CTRL1 to the data driver 140 and applies a second control signal CTRL2 to the gate driver 150. The first control signal CTRL1 includes a horizontal synchronization start signal, a clock signal and a line latch signal, for example, and the second control signal CTRL2 includes a vertical synchronization start signal, an output enable signal, a gate pulse signal and a dummy enable signal, for example.

The data driver 140 drives the data lines D1 to Dm in response to the third image signal DATA3 and the first control signal CTRL1 from the timing controller 130.

The gate driver 150 drives the gate lines G1 to Gn in response to the second control signal CTRL2 from the timing controller 130. The gate driver 130 may include a gate driver integrated circuit. The gate driver 130 may be realized by circuits including silicon semiconductor material, amorphous semiconductor material, crystalline semiconductor material and polycrystalline semiconductor material, for example.

The backlight unit 160 is disposed under the display panel 110 and corresponding to the pixels PX. The backlight unit 160 is controlled, e.g., turned on and off, in response to a backlight control signal LCS from the timing controller 160.

The shutter glasses 170 alternately opens and closes a left-eye shutter STL and a right-eye shutter STR in response to a shutter control signal ST from the timing controller 130. The timing controller 130 includes a wireless transmitter that transmits the shutter control signal ST, and the shutter glasses 170 include a wireless receiver that receives the shutter control signal ST. The left-eye shutter STL is opened and the right-eye shutter STR is closed while the left-eye image is displayed on the display panel 110. The left-eye shutter STL is closed and the right-eye shutter STR is opened while the right-eye image is displayed on the display panel 110. Accordingly, a viewer wearing the shutter glasses 170 perceives the 3D image.

Figure 3:
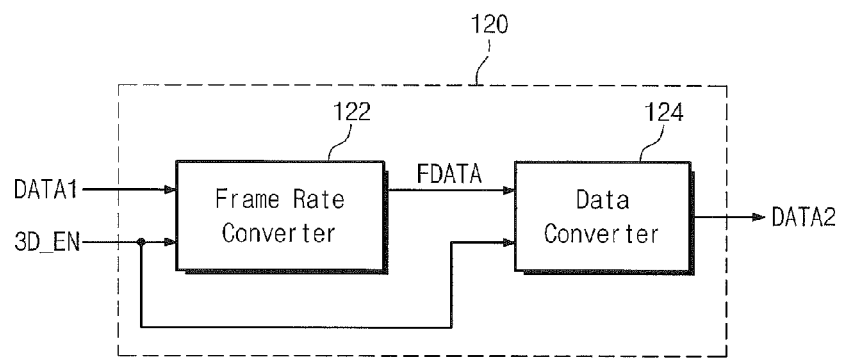
FIG. 3 is a block diagram showing an exemplary embodiment of a 3D controller shown in FIG. 1.

FIG. 3 is a block diagram showing an exemplary embodiment of a 3D controller shown in FIG. 1.

Referring to FIG. 3, the 3D controller 120 includes a frame rate converter 122 and a data converter 124.

The frame rate converter 120 separates the first image signal DATA1 into the left-eye image signal L and the right-eye image signal R in response to the 3D mode signal 3D_EN, and thereby outputs a frame image signal FDATA. In one exemplary embodiment, for example, the frame rate converter 120 sequentially and alternately outputs the left-eye image signal L and the right-eye image signal R as the frame image signal FDATA. In an exemplary embodiment, the frame image signal FDATA has a frequency about twice higher than a frequency of the first image signal DATA1. In one exemplary embodiment, for example, the first image signal DATA1 has a frequency of about 60 hertz (Hz), and the frame image signal FDATA has a frequency of about 120 Hz.

The data converter 124 converts the frame image signal FDATA to the second image signal DATA2 in response to the 3D mode signal 3D_EN. In one exemplary embodiment, for example, the data converter 124 converts the frame image signal FDATA to the second image signal DATA2 to allow the left-eye image signal L to be applied to the left-eye pixels LPX and the black image signal B to be applied to the right-eye pixels RPX during the left-eye frame. In such an embodiment, the data converter 124 converts the frame image signal FDATA to the second image signal DATA2 to allow the black image signal B to be applied to the left-eye pixels LPX and the right-eye image signal R to be applied to the right-eye pixels RPX during the right-eye frame.

Figure 4:
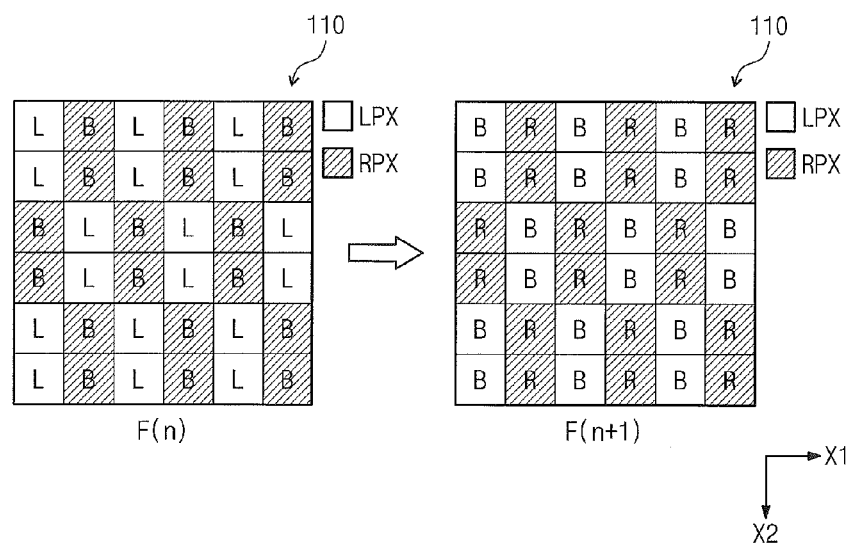
FIG. 4 is a view showing an exemplary embodiment of an image signal displayed on a display panel by a second image signal output from the 3D controller shown in FIG. 3.

FIG. 4 is a view showing an exemplary embodiment of an image signal displayed on a display panel by a second image signal output from the 3D controller shown in FIG. 3.

Referring to FIGS. 3 and 4, in an exemplary embodiment, the 3D controller 120 outputs the second image signal DATA2 such that the left-eye image signal L is applied to the left-eye pixels LPX and the black image signal B is applied to the right-eye pixels RPX during the left-eye frame F(n). Therefore, the left-eye image is displayed on the display panel 110 during the left-eye frame F(n).

In such an embodiment, the 3D controller 120 outputs the second image signal DATA2 such that the black image signal B is applied to the left-eye pixels LPX and the right-eye image signal R is applied to the right-eye pixels RPX during the right-eye frame F(n+1). Therefore, the right-eye image is displayed on the display panel 110 during the right-eye frame F(n+1).

Figure 5:
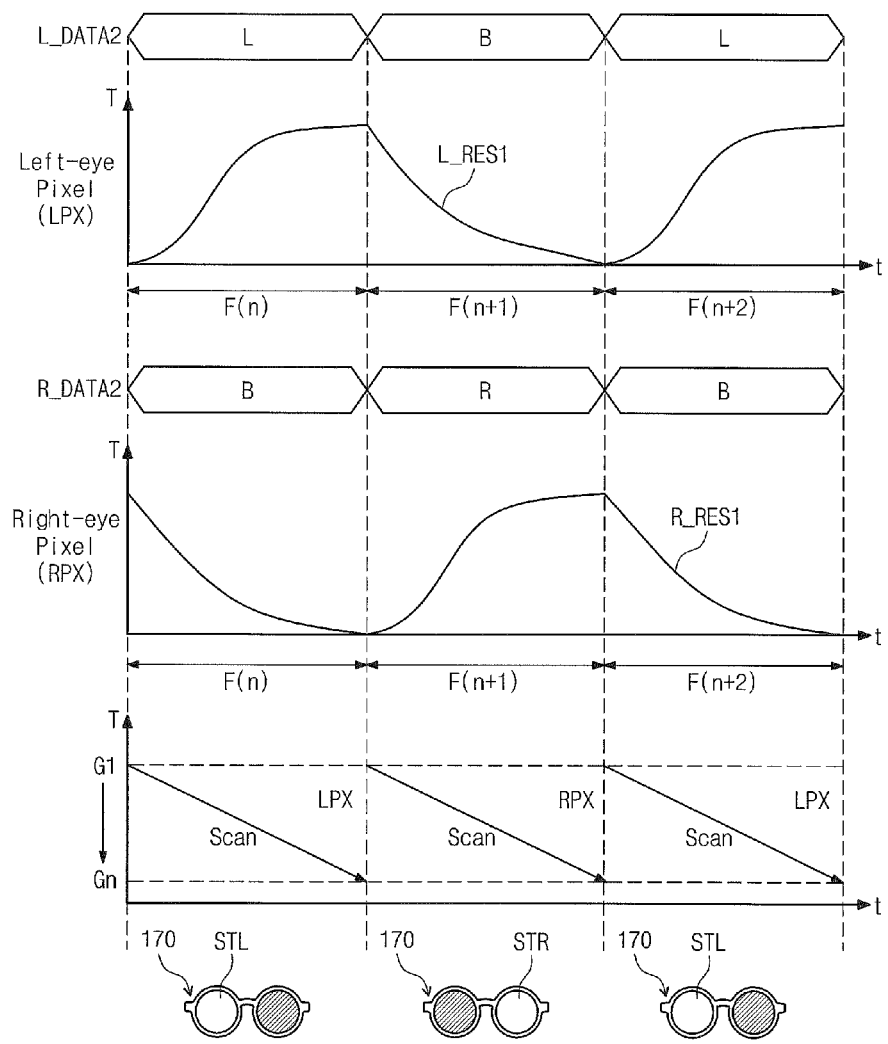
FIG. 5 is a view showing a response of a liquid crystal in the left-eye pixels and the right-eye pixels of the display panel shown in FIG. 4.

FIG. 5 is a view showing a response of a liquid crystal in the left-eye pixels and the right-eye pixels of the display panel shown in FIG. 4.

Referring to FIG. 5, after the left-eye image is displayed in the left-eye pixels LPX during the left-eye frame F(n), the right-eye image is displayed in the right-eye pixels RPX during the right-eye frame F(n+1). In an exemplary embodiment of the second image signal DATA2, a left-eye second image signal L_DATA2 applied to the left-eye pixels LPX includes the left-eye image signal L and the black image signal B, which are alternately arranged with each other. In an exemplary embodiment of the second image signal DATA2, a right-eye second image signal R_DATA2 applied to the right-eye pixels RPX includes the black image signal B and the right-eye image signal R, which are alternately arranged with each other.

When the left-eye image and the right-eye image are displayed on the display panel 110 in the unit of one frame, the left-eye shutter STL and the right-eye shutter STR of the shutter glasses 170 are alternately opened and closed, thereby displaying the 3D image.

When a data voltage corresponding to the left-eye image signal L is applied to the left-eye pixels LPX and then a data voltage corresponding to the black image signal B is applied to the left-eye pixels LPX, a variation of a transmittance T of the left-eye pixels LPX, that is, a falling time of a liquid crystal response L_RES1 of the left-eye pixels LPX is delayed by a predetermined time. As the left-eye image signal L approaches to a white gray-scale, the falling time of the liquid crystal response L_RES1 at a time point when the left-eye image signal L is converted to the black image signal B becomes longer.

Similarly, when a data voltage corresponding to the right-eye image signal R is applied to the right-eye pixels RPX and then the data voltage corresponding to the black image signal B is applied, a variation of a transmittance T of the right-eye pixels RPX, that is, a falling time of a liquid crystal response R_RES1 of the right-eye pixels RPX is delayed by a predetermined time. As the right-eye image signal R approaches to the white gray-scale, the falling time of the liquid crystal response R_RES1 at a time point when the right-eye image signal R is converted to the black image signal B becomes longer.

In an exemplary embodiment, the left-eye pixels LPX display only the left-eye image signal L and the right-eye pixels RPX display only the right-eye image signal R. Since the left-eye pixels LPX display the left-eye image signal L during the left-eye frame F(n) and displays the black image signal B during the right-eye frame F(n+1), the right-eye image in the right-eye frame F(n+1) is effectively prevented from being influenced by the left-eye image in the left-eye frame F(n) even though the falling time of the liquid crystal response is lengthened. Similarly, since the right-eye pixels RPX display the right-eye image signal R during the right-eye frame F(n+1) and displays the black image signal B during the left-eye frame F(n), the left-eye image in the left-eye frame F(n) is effectively prevented from being influenced by the right-eye image in the right-eye frame F(n+1) even though the response time of the liquid crystal becomes slow.

In an exemplary embodiment, where the display panel 110 has a resolution of 3840×2160, e.g., ultra high definition, the resolution of the display panel 110 in the 3D display mode is about 1920×1080, e.g., full high definition, as the pixels PX are divided into the left-eye pixels LPX and the right-eye pixels RPX.

Figure 6:
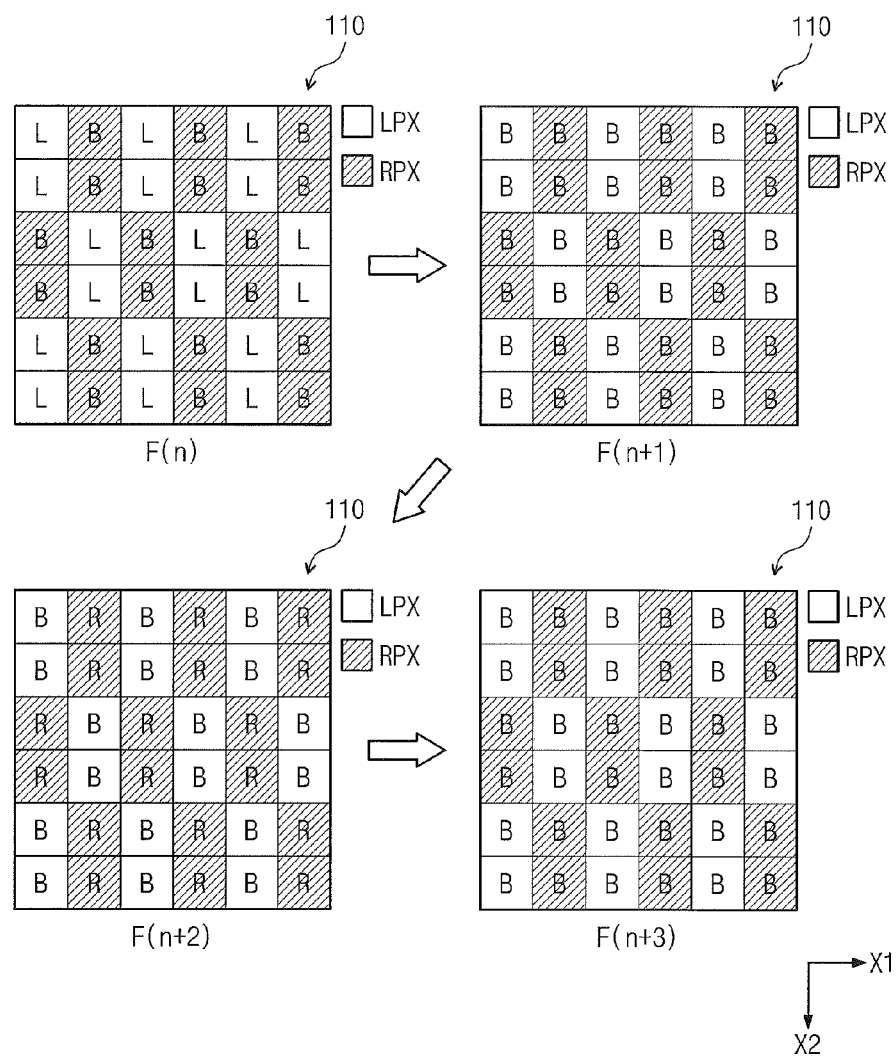
FIG. 6 is a view showing another exemplary embodiment of an image signal displayed on a display panel shown in FIG. 1 by a second image signal output from the 3D controller shown in FIG. 3 according to the invention.

FIG. 6 is a view showing another embodiment of an image signal displayed on a display panel shown in FIG. 1 by a second image signal output from the 3D controller shown in FIG. 3 according to the invention.

Referring to FIGS. 3 and 6, the data converter 124 of the 3D controller 120 further outputs the second image signal DATA2 of a first sub-frame F(n+1) between the left-eye frame F(n) and the right-eye frame F(n+2) and the second image signal DATA2 of a second sub-frame F(n+3) between the right-eye frame F(n+2) and the right-eye frame F(n+4). In one exemplary embodiment, for example, the frame image signal FDATA output from frame rate converter 122 of the 3D controller 120 is about 120 Hz, and the second image signal DATA2 has a frequency of about 240 Hz.

The data converter 124 outputs the second image signal DATA2 such that the black image signal B and the right-eye image signal R are respectively applied to the left-eye pixels LPX and the right-eye pixels RPX during the right-eye frame F(n+2). Therefore, the right-eye image is displayed on the display panel 110 during the right-eye frame F(n+2). The black image signal B is applied to all the left-eye pixels LPX and all the right-eye pixels RPX during the second sub-frame F(n+3). Therefore, the black image is displayed on the display panel 110 during the second sub-frame F(n+3).

Figure 7:
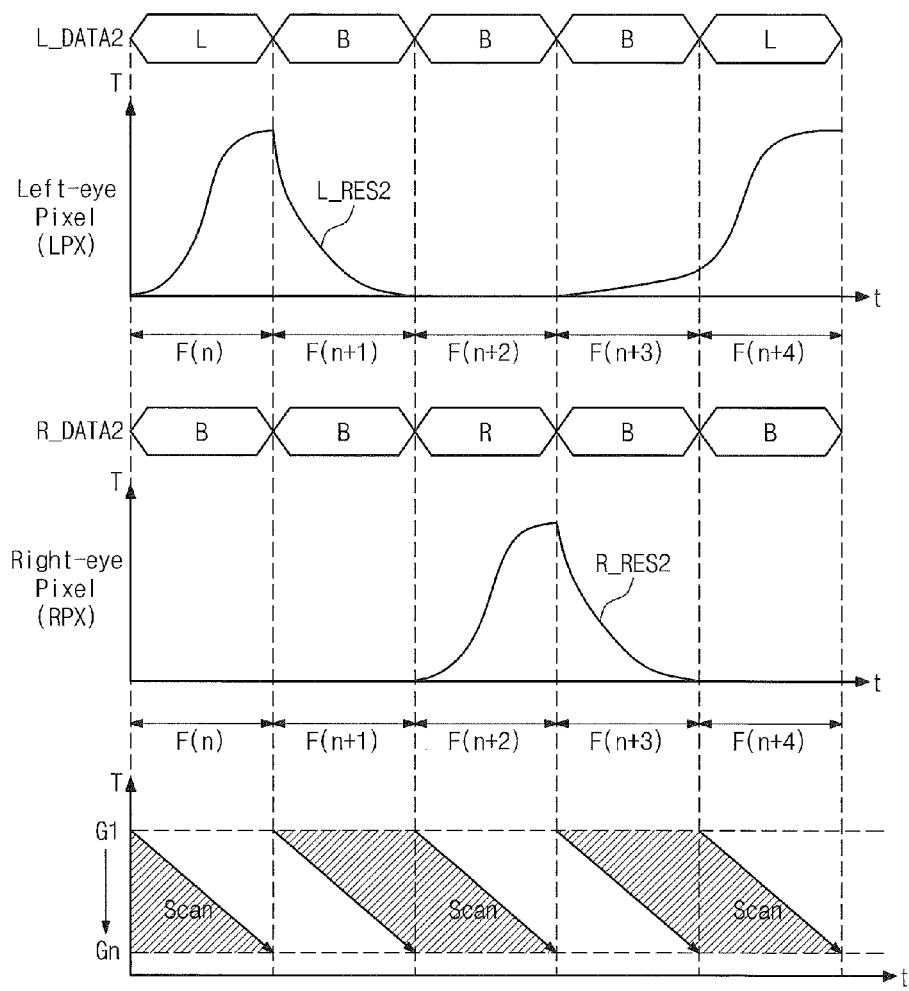
FIG. 7 is a view showing a response of a liquid crystal in the left-eye pixels and the right-eye pixels of the display panel shown in FIG. 6.

FIG. 7 is a view showing a response of a liquid crystal in the left-eye pixels and the right-eye pixels of the display panel shown in FIG. 6.

Referring to FIG. 7, the black image signal B is displayed on the display panel 110 during the first sub-frame F(n+1) after the left-eye image signal L is displayed in the left-eye pixels LPX of the display panel 110 during the left-eye frame F(n). In such an embodiment, the black image signal B is displayed on the display panel 110 during the second sub-frame F(n+3) after the right-eye image signal R is displayed in the right-eye pixels RPX of the display panel 110 during the right-eye frame F(n+2). The left-eye frame F(n), the first sub-frame F(n+1), the right-eye frame F(n+2) and the second sub-frame F(n+3) are sequentially repeated.

In an exemplary embodiment of the second image signal DATA2, the left-eye second image signal L_DATA2 applied to the left-eye pixels LPX includes the left-eye image signal L, the black image signal B, the black image signal B and the black image signal B, which are sequentially repeatedly arranged therein. In an exemplary embodiment of the second image signal DATA2, the right-eye second image signal R_DATA2 applied to the right-eye pixels RPX includes the black image signal B, the black image signal B, the right-eye image signal R and the black image signal B, which are sequentially repeatedly arranged therein.

In an exemplary embodiment, the black image is displayed on the display panel 110 during the first sub-frame F(n+1) after the left-eye image is displayed on the display panel 110, and the black image is displayed on the display panel 110 during the second sub-frame F(n+3) after the right-eye image is displayed on the display panel 110. Thus, the right-eye image in the right-eye frame F(n+1) is effectively prevented from being influenced by the left-eye image in the left-eye frame F(n) even though the liquid crystal response is slow.

Figure 8:
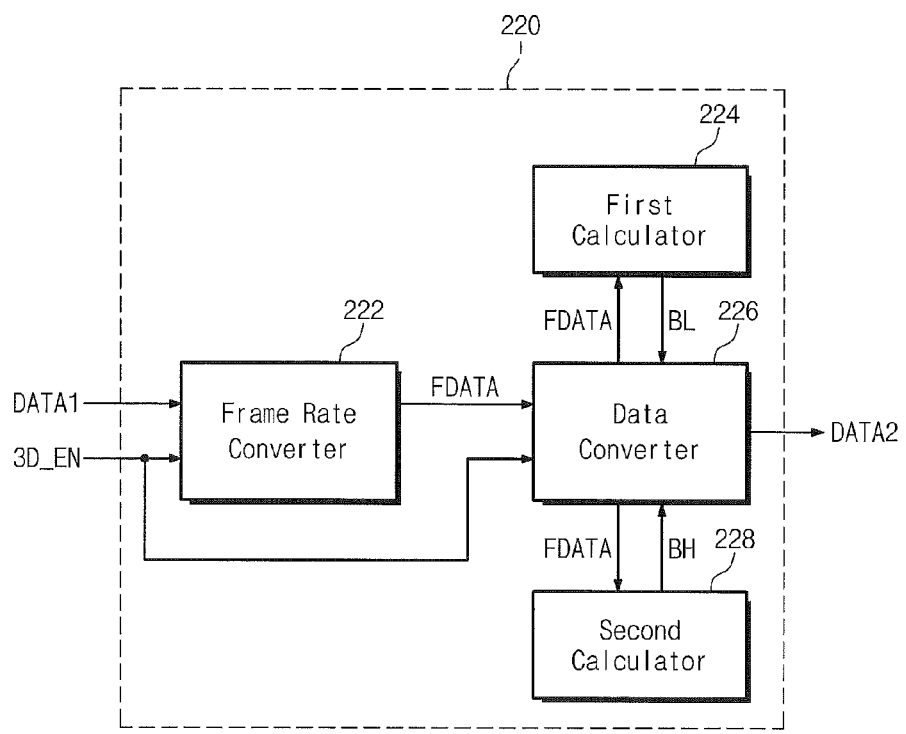
FIG. 8 is a block diagram showing an alternative exemplary embodiment of a 3D controller according to the invention.

FIG. 8 is a block diagram showing an alternative exemplary embodiment of a 3D controller according to the invention.

Referring to FIG. 8, a 3D controller 220 includes a frame rate converter 222, a first calculator 224, a data converter 226 and a second calculator 228.

The frame rate converter 222 separates the first image signal DATA1 into the left-eye image signal L and the right-eye image signal R in response to the 3D mode signal 3D_EN and thereby outputs a frame image signal FDATA. In one exemplary embodiment, for example, the frame rate converter 222 sequentially and alternately outputs the left-eye image signal L and the right-eye image signal R as the frame image signal FDATA. In an exemplary embodiment, the frame image signal FDATA has a frequency about twice higher than the frequency of the first image signal DATA1. In one exemplary embodiment, for example, the first image signal DATA1 has a frequency of about 60 Hz, and the frame image signal FDATA has a frequency of about 120 Hz.

The data converter 226 converts the frame image signal FDATA to the second image signal DATA2 in response to the 3D mode signal 3D_EN. In one exemplary embodiment, for example, the data converter 226 converts the frame image signal FDATA to the second image signal DATA2 to allow the left-eye image signal L to be applied to the left-eye pixels LPX and the black image signal B to be applied to the right-eye pixels RPX during the left-eye frame. In such an embodiment, the data converter 226 converts the frame image signal FDATA to the second image signal DATA2 to allow the black image signal B to be applied to the left-eye pixels LPX and the right-eye image signal R to be applied to the right-eye pixels RPX during the right-eye frame.

During a first sub-frame between the left-eye frame and the right-eye frame, the data converter 226 applies a low gray-scale black image signal BL corresponding to a gray-scale level lower than a gray-scale level of the black image signal B to the left-eye pixels LPX and applies a high gray-scale black image signal BH corresponding to a gray-scale level higher a gray-scale level that of the black image signal B to the right-eye pixels RPX. In addition, during a second sub-frame between the right-eye frame and the left-eye frame, the data converter 226 applies the high gray-scale black image signal BH corresponding to the gray-scale level higher than the gray-scale level of the black image signal B to the left-eye pixels LPX and applies the lower gray-scale black image signal BL corresponding to the gray-scale level lower than the gray-scale level of the black image signal B to the right-eye pixels RPX.

The first calculator 224 receives the frame image signal FDATA from the data converter 226 and outputs the low gray-scale black image signal BL to the data converter 226. The first calculator 224 calculates the low gray-scale black image signal BL using the following Equation 1.

$$BL = -GL(FDATA) \times FDATA \quad \text{[Equation 1]}$$

In Equation 1, GL is a proportionality constant of each gray-scale level. That is, GL(FDATA) is a proportionality constant determined based on a gray-scale level of the frame image signal FDATA. GL(FDATA) may be stored in a separate look-up table. The low gray-scale black image signal BL may be re-calculated whenever the frame image signal FDATA is provided, e.g., every frame. Thus, the low gray-scale black image signal BL of each of the first and second sub-frames may be renewed in accordance with the gray-scale level of the frame image signal FDATA.

The second calculator 228 receives the frame image signal FDATA from the data converter 226 and outputs the high gray-scale black image signal BH to the data converter The second calculator 228 calculates the high gray-scale black image signal BH using the following Equation 2.

$$BH = -GH(FDATA) \times FDATA \quad \text{[Equation 2]}$$

In Equation 2, GL is a proportionality constant of each gray-scale level. That is, GH(FDATA) is a proportionality constant determined based on the gray-scale level of the frame image signal FDATA. GH(FDATA) may be stored in a separate look-up table. The high gray-scale black image signal BH may be re-calculated whenever the frame image signal FDATA is provided, e.g., every frame. Thus, the high gray-scale black image signal BH of each of the first and second sub-frames may be renewed in accordance with the gray-scale level of the frame image signal FDATA. In an exemplary embodiment, the proportionality constants GL and GH may be substantially the same as each other, but not being limited thereto. In an alternative exemplary embodiment, the proportionality constants GL and GH may be different values from each other.

Figure 9:
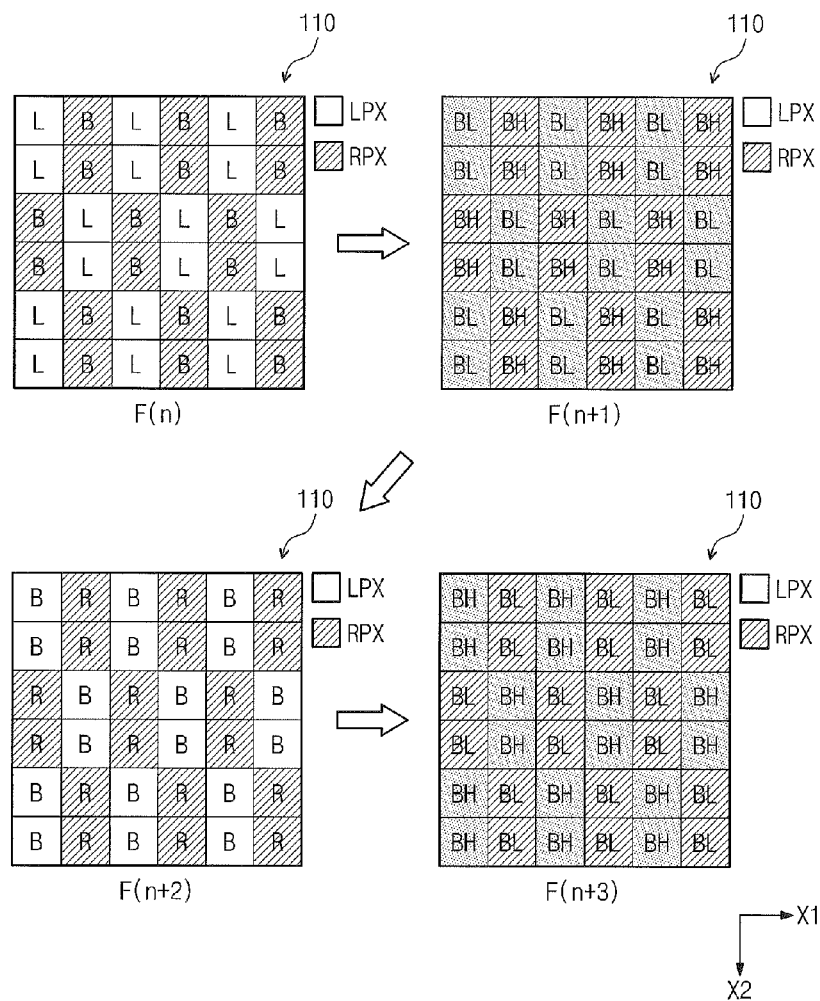
FIG. 9 is a view showing an exemplary embodiment of an image signal displayed on a display panel shown in FIG. 1 by a second image signal output from the 3D controller shown in FIG. 8.

FIG. 9 is a view showing an exemplary embodiment of an image signal displayed on a display panel shown in FIG. 1 by a second image signal output from the 3D controller shown in FIG. 8.

Referring to FIG. 9, the left-eye pixels LPX of the display panel 110 display the left-eye image signal L during the left-eye frame F(n) and the right-eye pixel RPX of the display panel 110 display the black image signal B. During the first sub-frame F(n+1), the left-eye pixels LPX of the display panel 110 display the low gray-scale black image signal BL and the right-eye pixels RPX of the display panel 110 display the high gray-scale black image signal BH. During the right-eye frame F(n+2), the left-eye pixels LPX of the display panel 110 display the black image signal B and the right-eye pixels RPX of the display panel 110 display the right-eye image signal R. During the second sub-frame F(n+3), the left-eye pixels LPX of the display panel 110 display the high gray-scale black image signal BH and the right-eye pixels RPX of the display panel 110 display the low gray-scale black image signal BL.

Figure 10:
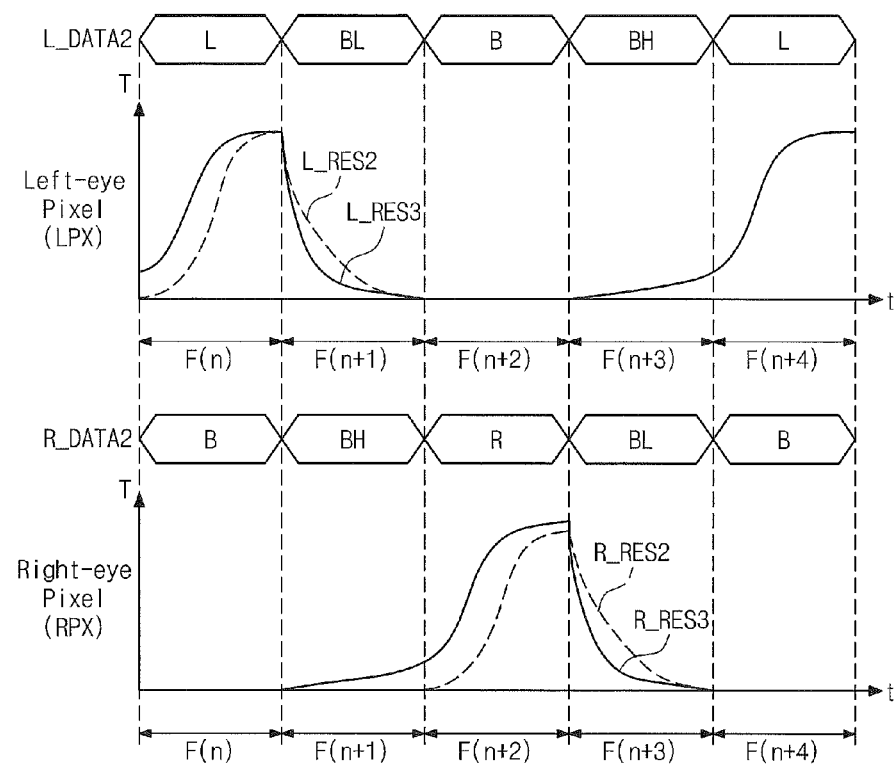
FIG. 10 is a view showing a response of a liquid crystal in the left-eye pixels and the right-eye pixels of the display panel shown in FIG. 9.

FIG. 10 is a view showing a response of a liquid crystal in the left-eye pixels and the right-eye pixels of the display panel shown in FIG. 9.

Referring to FIG. 10, in an exemplary embodiment of the second image signal DATA2, the left-eye second image signal L_DATA2 applied to the left-eye pixels LPX includes the left-eye image signal L, the low gray-scale black image signal BL, the black image signal B and the high gray-scale black image signal BH, which are sequentially repeatedly arranged therein. In an exemplary embodiment of the second image signal DATA2, the right-eye second image signal R_DATA2 applied to the right-eye pixels RPX includes the black image signal B, the high gray-scale black image signal BH, the right-eye image signal R and the low gray-scale black image signal BL, which are sequentially repeatedly arranged therein.

In an exemplary embodiment, as shown in FIG. 10, since the low gray-scale black image signal BL is applied to the left-eye pixels LPX in the first sub-frame F(n+1) after the left-eye frame F(n), the falling time of the liquid crystal response L_RES3 of the left-eye pixels LPX may be less than the falling time of the liquid crystal response L_RES2 shown in FIG. 7. In such an embodiment, since the high gray-scale black image signal BH is applied to the right-eye pixels RPX in the first sub-frame F(n+1) after the left-eye frame F(n), the rising time of the liquid crystal response R_RES3 of the right-eye pixels RPX may be less than the rising time of the liquid crystal response R_RES2 shown in FIG. 7.

In an exemplary embodiment, as shown in FIG. 10, since the high gray-scale black image signal BH is applied to the left-eye pixels LPX in the second sub-frame F(n+3) after the right-eye frame F(n+2), the rising time of the liquid crystal response L_RES3 of the left-eye pixels LPX may be less than the rising time of the liquid crystal response L_RES2 shown in FIG. 7. In such an embodiment, since the low gray-scale black image signal BL is applied to the right-eye pixels RPX in the second sub-frame F(n+3) after the right-eye frame F(n+2), the falling time of the liquid crystal response R_RES3 of the right-eye pixels RPX may be less than the falling time of the liquid crystal response R_RES2 shown in FIG. 7. In an exemplary embodiment, a crosstalk phenomenon, in which the left-eye image and the right-eye image are influenced by each other, is substantially reduced or effectively prevented, and thus a display quality of the 3D image is substantially improved.

Figure 11:
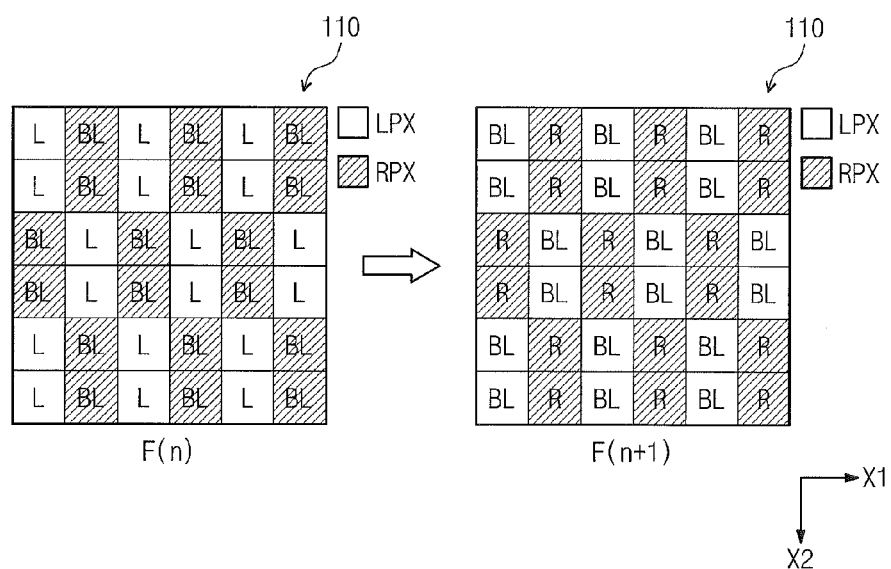
FIG. 11 is a view showing another exemplary embodiment of an image signal displayed on a display panel shown in FIG. 1 by a second image signal output from the 3D controller shown in FIG. 8 according to the invention.

FIG. 11 is a view showing another exemplary embodiment of an image signal displayed on a display panel shown in FIG. 1 by a second image signal output from the 3D controller shown in FIG. 8 according to the invention.

Referring to FIGS. 8 and 11, the data converter 226 converts the frame image signal FDATA to the second image signal DATA2 in response to the 3D mode signal 3D_EN. In one exemplary embodiment, for example, the data converter 226 converts the frame image signal FDATA to the second image signal DATA2 such that the left-eye image signal L is applied to the left-eye pixels LPX during the left-eye frame and the low gray-scale black image signal BL is applied to the right-eye pixels RPX during the left-eye frame. In such an embodiment, the data converter 124 converts the frame image signal FDATA to the second image signal DATA2 such that the low gray-scale black image signal BL is applied to the left-eye pixels LPX during the right-eye frame and the right-eye image signal R is applied to the right-eye pixels RPX during the right-eye frame. The second image signal DATA2 has substantially the same frequency of about 120 Hz as the frame image signal FDATA.

Figure 12:
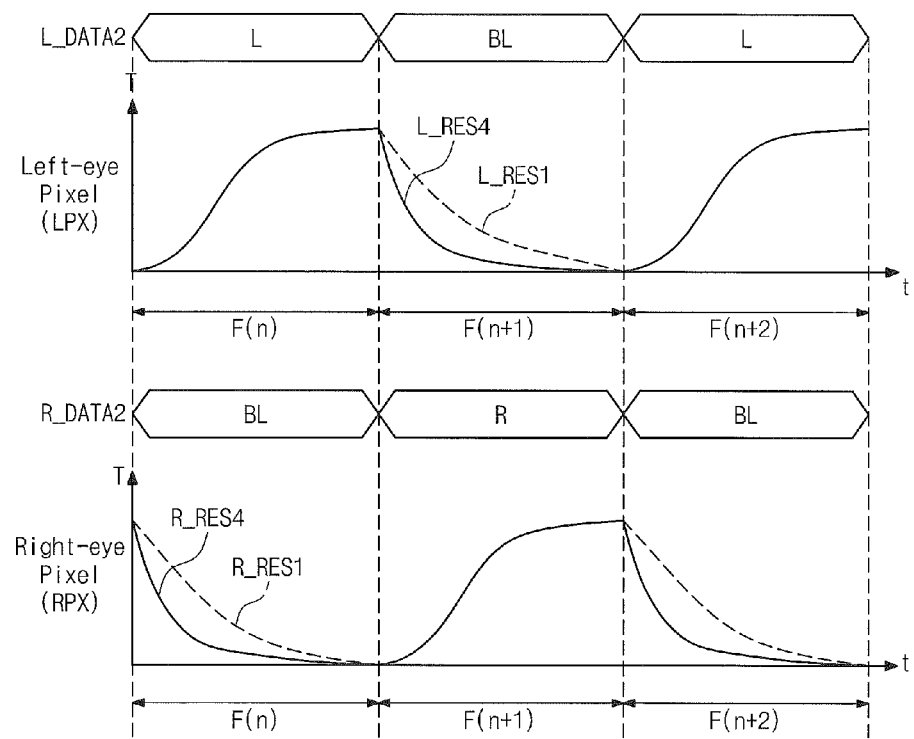
FIG. 12 is a view showing a response of a liquid crystal in the left-eye pixels and the right-eye pixels of the display panel shown in FIG. 11.

FIG. 12 is a view showing a response of a liquid crystal in the left-eye pixels and the right-eye pixels of the display panel shown in FIG. 11.

Referring to FIG. 12, the left-eye second image signal L_DATA2 of the second image signal DATA2, which is applied to the left-eye pixels LPX, includes the left-eye image signal L and the low gray-scale black image signal BL, which are sequentially repeatedly arranged therein. The right-eye second image signal R_DATA2 of the second image signal DATA2, which is applied to the right-eye pixels RPX, includes the low gray-scale black image signal BL and the right-eye image signal R, which are sequentially repeatedly arranged therein.

Since the low gray-scale black image signal BL is applied to the left-eye pixels LPX in the right-eye frame F(n+1) after the left-eye frame F(n), the falling time of the liquid crystal response L_RES4 of the left-eye pixels LPX may be less than the falling time of the liquid crystal response L_RES1 shown in FIG. 5. In such an embodiment, since the low gray-scale black image signal BL is applied to the right-eye pixels RPX in the left-eye frame F(n+2) after the right-eye frame F(n+1), the falling time of the liquid crystal response R_RES4 of the right-eye pixels RPX may be less than the falling time of the liquid crystal response R_RES1 shown in FIG. 5.

Figure 13:
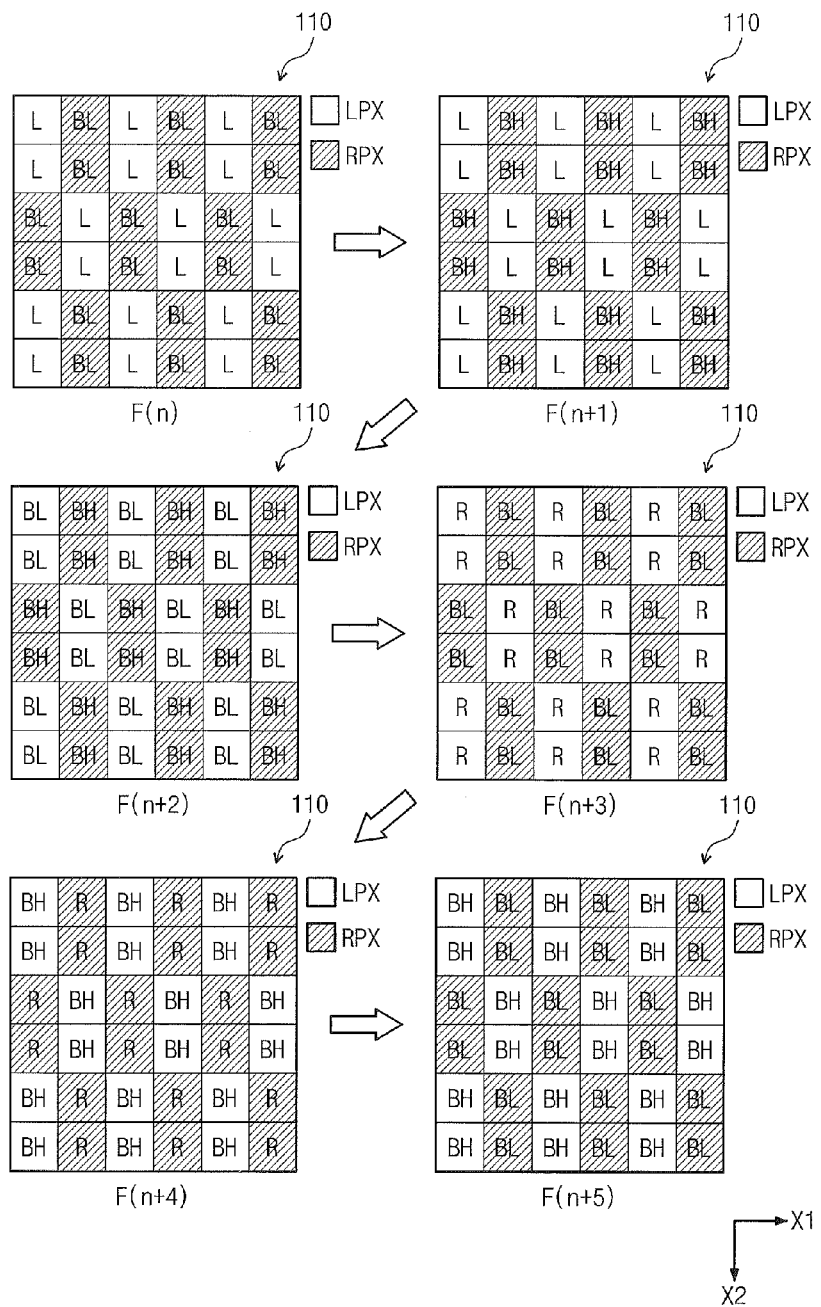
FIG. 13 is a view showing another exemplary embodiment of an image signal displayed on a display panel shown in FIG. 1 by a second image signal output from the 3D controller shown in FIG. 8 according to the invention.

FIG. 13 is a view showing another exemplary embodiment of an image signal displayed on a display panel shown in FIG. 1 by a second image signal output from the 3D controller shown in FIG. 8 according to the invention.

Referring to FIGS. 8 and 13, the data converter 226 converts the frame image signal FDATA to the second image signal DATA2 in response to the 3D mode signal 3D_EN. In an exemplary embodiment, the frame image signal FDATA has a frequency of about 120 Hz, and the second image signal DATA2 has a frequency of about 360 Hz.

The data converter 226 converts the frame image signal FDATA to the second image signal DATA2 such that the left-eye image signal L is applied to the left-eye pixels LPX during the left-eye frame F(n) and the left-eye frame F(n+1), and the low gray-scale black image signal BL and the high gray-scale black image signal BH are sequentially applied to the right-eye pixels RPX during the left-eye frame F(n) and the left-eye frame F(n+1).

In such a embodiment, the data converter 226 outputs the second image signal DATA2 to allow the low gray-scale black image signal BL and the high gray-scale black image signal BH to be applied to the left-eye pixels LPX and the right-eye pixels RPX, respectively, during the first sub-frame F(n+2) after the left-eye frame F(n+1).

The data converter 226 converts the frame image signal FDATA to the second image signal DATA2 such that the right-eye image signal R is applied to the right-eye pixels RPX during successive two right-eye frame F(n+3) and right-eye frame F(n+4) and the low gray-scale black image signal BL and the high gray-scale black image signal BH are sequentially applied to the right-eye pixels RPX during the right-eye frame F(n+3) and the right-eye frame F(n+4).

In such an embodiment, the data converter 226 outputs the second image signal DATA2 to allow the high gray-scale black image signal BH and the low gray-scale black image signal BL to be respectively applied to the left-eye pixels LPX and the right-eye pixels RPX during the second sub-frame F(n+5) after the right-eye frame F(n+4).

Figure 14:
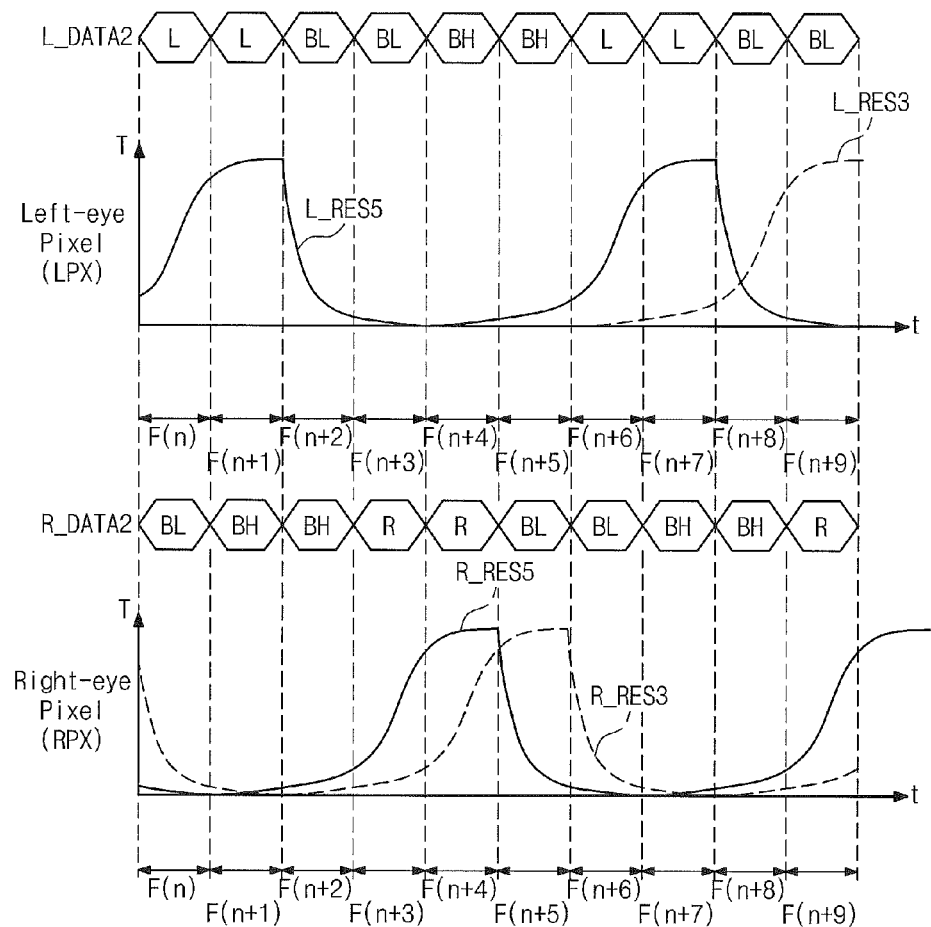
FIG. 14 is a view showing a response of a liquid crystal in the left-eye pixels and the right-eye pixels of the display panel shown in FIG. 13.

FIG. 14 is a view showing a response of a liquid crystal in the left-eye pixels and the right-eye pixels of the display panel shown in FIG. 13.

In FIG. 4, the liquid crystal response L_RES5 of the left-eye pixels LPX and the falling time of the liquid crystal response R_RES5 of the right-eye pixels RPX are shown. Referring to FIG. 14, in an exemplary embodiment of the second image signal DATA2, the left-eye second image signal L_DATA2 applied to the left-eye pixels LPX includes the left-eye image signal L, the left-eye image signal L, the low gray-scale black image signal BL, the low gray-scale black image signal BL, the high gray-scale black image signal BH and the high gray-scale black image signal BH, which are sequentially repeatedly arranged therein. In an exemplary embodiment of the second image signal DATA2, the right-eye second image signal R_DATA2 applied to the right-eye pixels RPX includes the low gray-scale black image signal BL, the high gray-scale black image signal BH, the high gray-scale black image signal BH, the right-eye image signal R and the low gray-scale black image signal BL, which are sequentially repeatedly arranged therein.

In one exemplary embodiment, as in FIG. 10, for example, the left-eye second image signal L_DATA2 applied to the left-eye pixels LPX includes the left-eye image signal L, the low gray-scale black image signal BL, the black image signal B and the high gray-scale black image signal BH. However, as shown in FIG. 14, the left-eye second image signal L_DATA2 applied to the left-eye pixels LPX does not include the black image signal B. Similarly, the right-eye second image signal R_DATA2 applied to the right-eye pixels RPX does not include the black image signal B. Therefore, in such an embodiment, the time, during which the black image is displayed, is substantially reduced such that the brightness of the image displayed on the display panel 110 is substantially improved.

Figure 15:
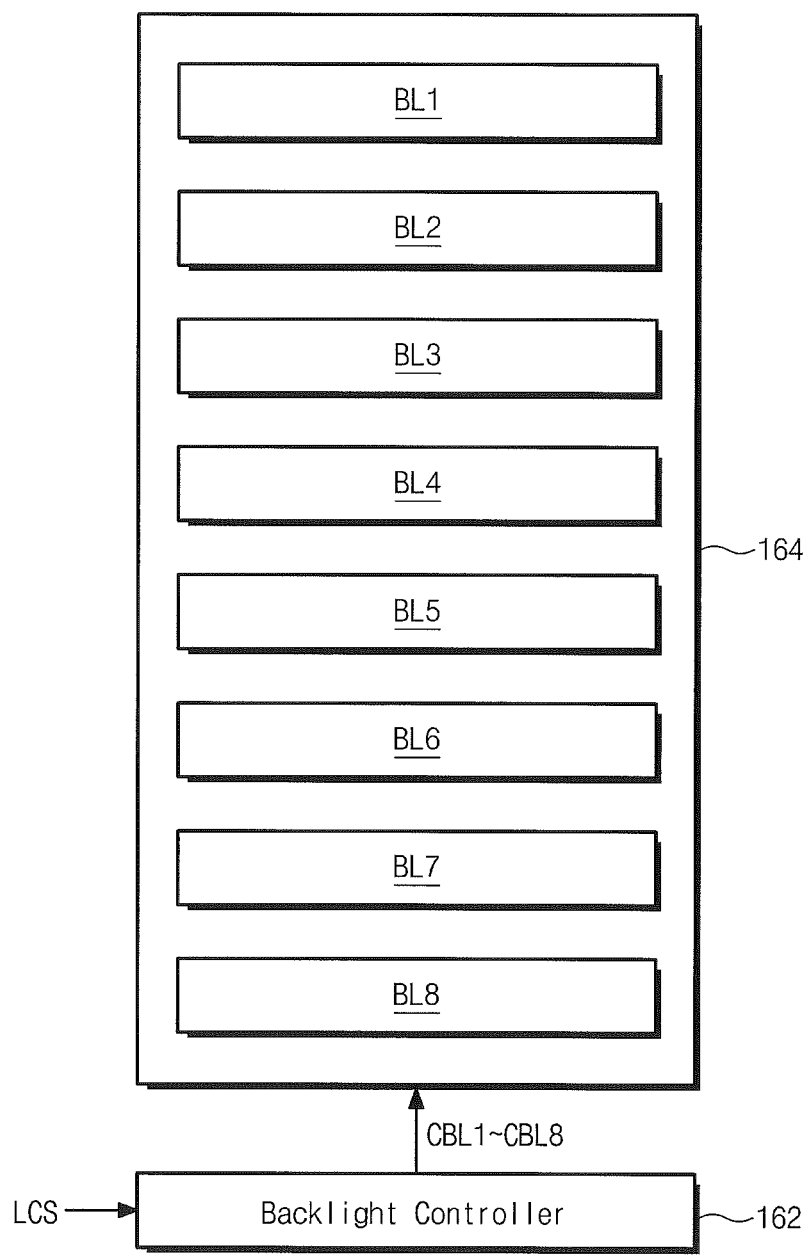
FIG. 15 is a block diagram showing an exemplary embodiment of a backlight unit shown in FIG. 1.

FIG. 15 is a block diagram showing an exemplary embodiment of a backlight unit shown in FIG. 1.

Referring to FIG. 15, the backlight unit 160 includes a backlight controller 162 and a light source part 164. The light source part 164 includes a plurality of light emitting blocks, e.g., first to eighth light emitting blocks BL1 to BL8. In an exemplary embodiment, the light source part 164 includes eight light emitting blocks BL1 to BL8, as shown in FIG. 15, but the number of the light emitting blocks is not limited thereto. In an exemplary embodiment, each of the first to eighth light emitting blocks BL1 to BL8 includes a plurality of red light emitting units (not shown), a plurality of green light emitting units (not shown) and a plurality of blue light emitting units (not shown).

The backlight controller 162 generates first to eighth block control signals CBL1 to CBL8 that controls, e.g., turn on or off, the first to eighth light emitting blocks BL1 to BL8, respectively, in response to a backlight control signal LCS from the timing controller 130 shown in FIG. 1. Each of the first to eighth light emitting blocks BL1 to BL8 are turned on or off in response to a corresponding block control signal of the first to eighth block control signals CBL1 to CBL8. In one exemplary embodiment, for example, the first light emitting block BL1 is turned on or off in response to the first block control signal CBL1, and the second light emitting block BL2 is turned on or off in response to the second block control signal CBL2.

In an exemplary embodiment, the first to eighth light emitting blocks BL1 to BL8 may be sequentially turned on or off in response to the first to eighth block control signals CBL1 to CBL8. In such an embodiment, the second light emitting block BL2 is turned on after a predetermined time lapses form a time point when the first light emitting block BL1 is turned on. In such an embodiment, the third light emitting block BL3 is turned on after a predetermined time lapses from a time point when the second light emitting block BL2 is turned on. In such a manner, the first to eighth light emitting blocks BL1 to BL8 are sequentially turned on or off.

In an exemplary embodiment, the gate lines GL1 to GLn are grouped into eight gate line groups, and the first to eighth light emitting blocks BL1 to BL8 correspond to the eighth gate line groups, respectively. In one exemplary embodiment, for example, the first light emitting block BL1 corresponds to a first gate line group. The first light emitting block BL1 is turned on when a first gate line of the first gate line group starts to be driven by a gate-on voltage. In such an embodiment, the second light emitting block BL2 corresponds to a second gate line group. The second light emitting block BL2 is turned on when a first gate line of the second gate line group starts to be driven by the gate-on voltage.

Figure 16:
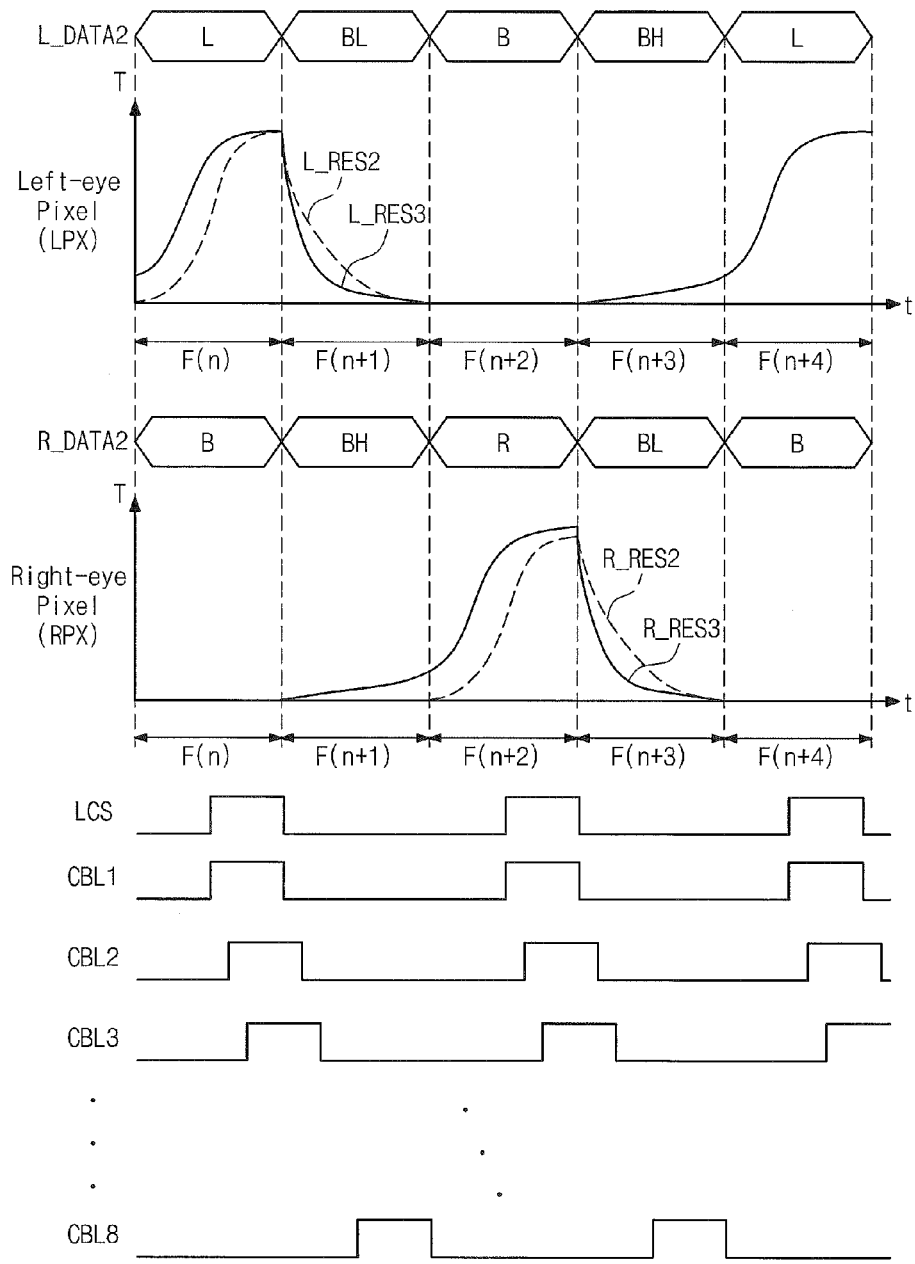
FIG. 16 is a signal timing diagram showing block control signals which sequentially turns on and off light emitting blocks.

FIG. 16 is a signal timing diagram showing block control signals which sequentially turns on and off light emitting blocks.

Referring to FIG. 16, the timing controller 130 sequentially activates the first to eighth block control signals CBL1 to CBL8 in synchronization with the third image signal DATA3. A period, in which each of the first to eighth block control signals CBL1 to CBL8 is activated to a logical high level, may correspond to a time, in which the image is perceived. The first to eighth light emitting blocks BL1 to BL8 are turned on when the left-eye image signal L and the right-eye image signal R are respectively applied to the left-eye pixels LPX and the right-eye pixels RPX, which are connected to the first gate line included in the corresponding gate line group, and turned off when the low gray-scale black image signal BL is applied to the left-eye pixels LPX and the right-eye pixels RPX, which are connected to a last gate line of the corresponding gate line group.

In an exemplary embodiment, as described above, the first to eighth light emitting blocks BL1 to BL8 are turned off in the first sub-frame F(n+1) and the second sub-frame F(n+3), and a color mixing phenomenon, which may occur when the image of the previous frame remains the image of the present frame as afterimage, is substantially reduced or effectively prevented.

Figure 17:
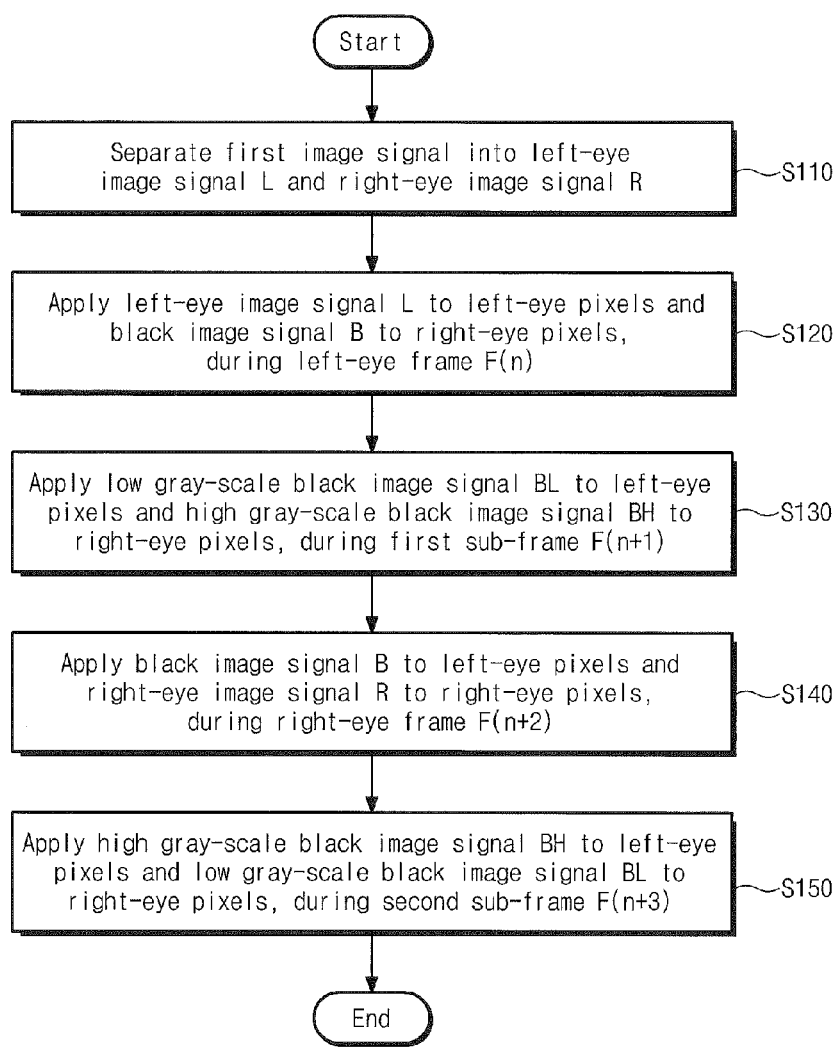
FIG. 17 is a flowchart showing an exemplary embodiment of a method of driving the display apparatus shown in FIG. 1.

FIG. 17 is a flowchart showing an exemplary embodiment of a method of driving the display apparatus shown in FIG. 1. For the convenience of description, an exemplary embodiment of the driving method of the display apparatus will be described with reference to FIGS. 1 and 8 to 10.

Referring to FIGS. 1, 8 to 10 and 17, the frame rate converter 222 of the 3D controller separates the first image signal DATA1 from the external source (not shown) into the left-eye image signal L and the right-eye image signal R (S110).

The data converter 226 of the 3D controller converts the frame image signal FDATA to the second image signal DATA2 to allow the left-eye image signal L to be applied to the left-eye pixels LPX and the black image signal B to be applied to the right-eye pixels RPX during the left-eye frame F(n) (S120). In response to the second image signal DATA2 from the 3D controller and the control signals, the timing controller 130 shown in FIG. 1 applies the first control signal CTRL1 and the third data signal DATA3 to the data driver 140, applies the second control signal CTRL2 to the gate driver 150, applies the backlight control signal LCS to the backlight unit 160, and applies the shutter control signal ST to the shutter glasses 170. The left-eye image is displayed on the display panel 110 based on the control of the data driver 140, the gate driver 150 and the backlight unit 160.

During the first sub-frame F(n+1), the data converter 226 applies the low gray-scale black image signal BL corresponding to the gray-scale level lower than the gray-scale level of the black image signal B to the left-eye pixels LPX and applies the high gray-scale black image signal BH corresponding to the gray-scale level higher than the gray-scale level of the black image signal B to the right-eye pixels RPX (S130). The black image is displayed on the display panel 110 by the control of the timing controller 130, the data driver 140, the gate driver 150 and the backlight unit 160.

The data converter 226 converts the frame image signal FDATA to the second image signal DATA2 to allow the black image signal B to be applied to the left-eye pixels LPX and the right-eye image signal R to be applied to the right-eye pixels RPX during the right-eye frame F(n+2) (S140). The right-eye image is displayed on the display panel 110 by the control of the timing controller 130, the data driver 140, the gate driver 150 and the backlight unit 160 during the right-eye frame F(n+2).

During the second sub-frame F(n+3), the data converter 226 applies the high gray-scale black image signal BH corresponding to the gray-scale level higher than the gray-scale level of the black image signal B to the left-eye pixels LPX and applies the low gray-scale black image signal BL corresponding to the gray-scale level lower than the gray-scale level of the black image signal B to the right-eye pixels RPX (S150). The black image is displayed on the display panel 110 based on the control of the timing controller 130, the data driver 140, the gate driver 150 and the backlight unit 160.

In an exemplary embodiment, as described above, the low gray-scale black image signal BL is applied to the left-eye pixels LPX and the right-eye pixels RPX in the first sub-frame F(n+1) and the second sub-frame F(n+3), and thus the falling time of the liquid crystal response is substantially reduced. In such an embodiment, since the high gray-scale black image signal BH is applied to the left-eye pixels LPS and the right-eye pixels RPX in the first sub-frame F(n+1) and the second sub-frame F(n+3), and thus the rising time of the liquid crystal response is substantially reduced.

Figure 18A:
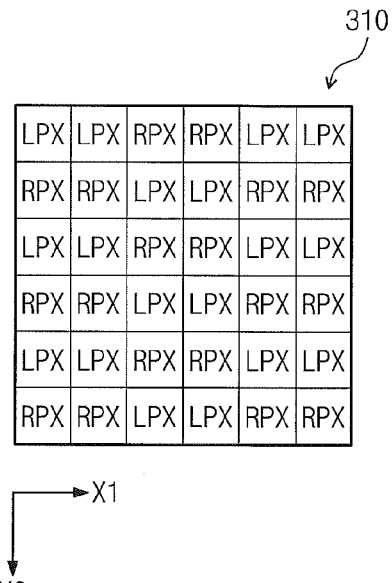
FIGS. 18A and 18B are views showing alternative exemplary embodiments of an arrangement of pixels for a left eye and pixels for a right eye in a display panel according to the invention.
Figure 18B:
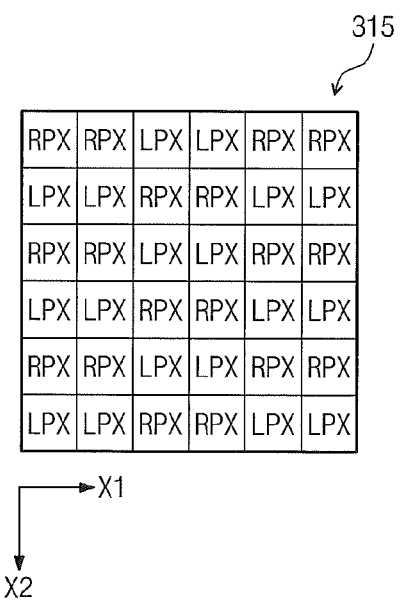

FIGS. 18A and 18B are views showing alternative exemplary embodiments of an arrangement of pixels for a left eye and an arrangement of pixels for a right eye in a display panel according to the invention.

Referring to FIG. 18A, in an exemplary embodiment, the left-eye pixels LPX are alternately arranged with the right-eye pixels RPX in the unit of two pixels in the first direction X1 of a display panel 310, and the left-eye pixels LPX are alternately arranged with the right-eye pixels RPX in the unit of one pixel in the second direction X2 of a display panel 310.

Referring to FIG. 18B, in an alternative exemplary embodiment, the right-eye pixels RPX are alternately arranged with the left-eye pixels LPX in the unit of two pixels in the first direction X1 of the display panel 110, and the right-eye pixels RPX are alternately arranged with the left-eye pixels LPX in the unit of one pixel in the second direction X2 of a display panel 315.

As shown in FIGS. 18A and 18B, the arrangement of the left-eye pixels LPX and right-eye pixels RPX in the display panel 310 of FIG. 18A is different from the arrangement of the left-eye pixels LPX and right-eye pixels RPX in the display panel 315 of FIG. 18B.

Figure 19:
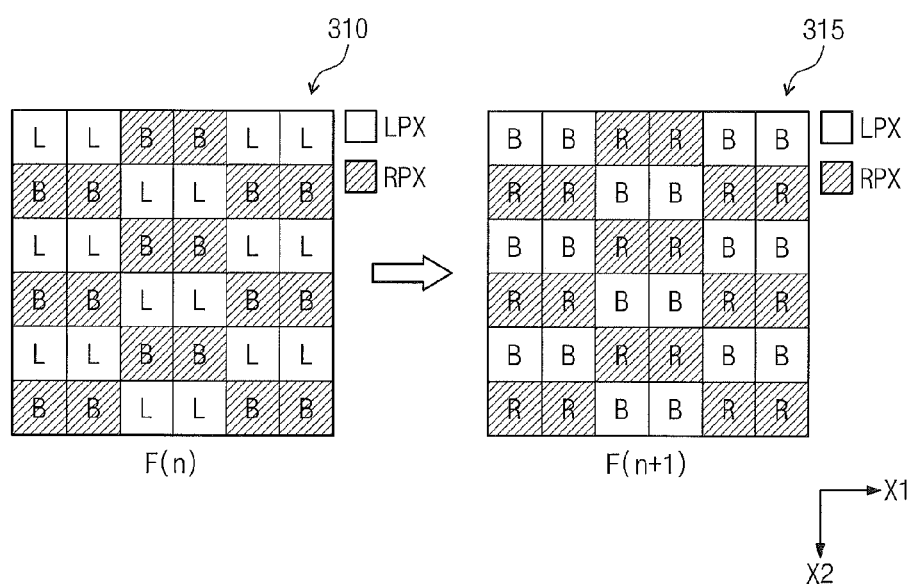
FIG. 19 is a view showing another exemplary embodiment of an image signal displayed on the display panel shown in FIG. 18A by a second image signal output from the 3D controller shown in FIG. 3 according to the invention.

FIG. 19 is a view showing another exemplary embodiment of an image signal displayed on the display panel shown in FIG. 18A by a second image signal output from the 3D controller shown in FIG. 3 according to the invention.

Referring to FIGS. 3 and 19, the 3D controller 120 outputs the second image signal DATA2 such that the left-eye image signal L is applied to the left-eye pixels LPX during the left-eye frame F(n) and the black image signal B is applied to the right-eye pixels RPX during the left-eye frame F(n). Therefore, the left-eye image is displayed on the display panel 110 during the left-eye frame F(n).

Meanwhile, the 3D controller 120 outputs the second image signal DATA2 such that the black image signal B is applied to the left-eye pixels LPX during the right-eye frame F(n+1) and the right-eye image signal R is applied to the right-eye pixels RPX during the right-eye frame F(n+1). Therefore, the right-eye image is displayed on the display panel 110 during the right-eye frame F(n+1).

When compared with FIGS. 4 and 19, the positions at which the left-eye image signal L and the right-eye image signal R are displayed are changed to each other in accordance with the arrangement of the left-eye pixel LPX and the right-eye pixel RPX, but the driving method is the same as described above.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A display apparatus comprising:
  a display panel comprising a plurality of left-eye pixels and a plurality of right-eye pixels;
  a three-dimensional controller which separates a first image signal into a left-eye image signal and a right-eye image signal, outputs a second image signal such that the left-eye image signal is applied to the left-eye pixels during a left-eye frame, a black image signal corresponding to a black data is applied to the right-eye pixels during the left-eye frame, the black image signal is applied to the left-eye pixels during a right-eye frame, and the right-eye image signal is applied to the right-eye pixels during the right-eye frame; and an image display controller which controls the second image signal in response to a control signal from an external source such that an image is displayed on the display panel based on the second image signal, wherein the left-eye pixels are alternately arranged with the right-eye pixels in the unit of two pixels in a first direction, wherein the left-eye pixels are alternately arranged with the right-eye pixels in the unit of a predetermined number of pixels in a second direction orthogonal to the first direction, and wherein the three-dimensional controller outputs the second image signal, based on which, the black image signal is applied to the left-eye pixels and the right-eye pixels during a first sub-frame between the left-eye frame and the right-eye frame and the black image signal is applied to the left-eye pixels and the right-eye pixels during a second sub-frame between the right-eye frame the left-eye frame.

2. The display apparatus of claim 1, wherein the second image signal applied to the left-eye pixels during a first sub-frame between the left-eye frame and the right-eye frame is a low gray-scale black image signal corresponding to a gray-scale level lower than a gray-scale level of the black data, and the second image signal applied to the right-eye pixels during a second sub-frame between the right-eye frame and the left-eye frame is the low gray-scale black image signal.

3. The display apparatus of claim 2, wherein the second image signal applied to the right-eye pixels during the first sub-frame is a high gray-scale black image signal corresponding to a gray-scale level higher than the gray-scale level of the black data, and the second image signal applied to the left-eye pixels during the second sub-frame is the high gray-scale black image signal.

4. The display apparatus of claim 3, wherein the second image signal applied to the left-eye pixels changes every frame in order of the left-eye image signal, the low gray-scale black image signal, the black image signal and the high gray-scale level black image signal, and the second image signal applied to the right-eye pixels changes every frame in order of the black image signal, the high gray-scale level black image signal, the right-eye image signal and the low gray-scale black image signal.

5. The display apparatus of claim 3, wherein the left-eye frame comprises a first left-eye frame and a second left-eye frame, the right-eye frame comprises a first right-eye frame and a second right-eye frame, each of the left-eye image signal, the left-eye image signal, the low gray-scale black image signal, the low gray-scale black image signal, the high gray-scale black image signal and the high gray-scale black image signal is applied to the left-eye pixels as the second image signal in a corresponding frame of the first left-eye frame, the second left-eye frame, the first sub-frame, the first right-eye frame, the second right-eye frame and the second sub-frame, and each of the low gray-scale black image signal, the high gray-scale black image signal, the high gray-scale black image signal, the right-eye image signal, the right-eye image signal and the low gray-scale black image signal is applied to the right-eye pixels as the second image signal in a corresponding frame of the first left-eye frame, the second left-eye frame, the first sub-frame, the first right-eye frame, the second right-eye frame and the second sub-frame.

6. The display apparatus of claim 1, wherein the three-dimensional controller comprises:

a frame rate converter which separates the first image signal into the left-eye image signal and the right-eye image signal; and a data converter which outputs the second image signal such that the left-eye image signal is applied to the left-eye pixels during the left-eye frame, the black image signal is applied to the right-eye pixels during the left-eye frame, the black image signal is applied to the left-eye pixels during the right-eye frame, and the right-eye image signal is applied to the right-eye pixels during the right-eye frame.

7. The display apparatus of claim 6, wherein the frame rate converter and the data converter operates in response to a mode signal which indicates a three-dimensional display mode.

8. The display apparatus of claim 1, wherein the three-dimensional controller comprises:

a frame rate converter which separates the first image signal into the left-eye image signal and the right-eye image signal;

a first calculator which generates a low gray-scale black image signal of a present frame based on the left-eye image signal of a previous frame or the right-eye image signal of the previous frame;

a second calculator which generates a high gray-scale black image signal of the present frame based on the left-eye image signal of the previous frame or the right-eye image signal of the previous frame; and a data converter which outputs the second image signal such that the left-eye image signal is applied to the left-eye pixels during the left-eye frame, the black image signal is applied to the right-eye pixels during the left-eye frame, the black image signal is applied to the left-eye pixels during the right-eye frame, and the right-eye image signal is applied to the right-eye pixels during the right-eye frame, wherein the data converter outputs the low gray-scale black image signal to the left-eye pixels as the second image signal during a first sub-frame between the left-eye frame and the right-eye frame, and wherein the data converter outputs the high gray-scale black image signal to the right-eye pixels as the second image signal during the first sub-frame.

9. The display apparatus of claim 8, wherein the data converter outputs the high gray-scale black image signal to the left-eye pixels as the second image signal during a second sub-frame between the right-eye frame, and the data converter outputs the left-eye frame and the low gray-scale black image signal to the right-eye pixels as the second image signal during the second sub-frame.

10. The display apparatus of claim 9, wherein the image display controller comprises:

a data driver which drives a plurality of data lines connected to the left-eye pixels and the right-eye pixels;

a gate driver which drives a plurality of gate lines connected to the left-eye pixels and the right-eye pixels; and a timing controller which converts the second image signal from the three-dimensional controller to a third image signal in response to the control signal and controls the data driver and the gate driver such that the third image signal is displayed in the left-eye pixels and the right-eye pixels.

11. The display apparatus of claim 10, further comprising:

a plurality of light source groups arranged opposite to the light-eye pixels and the right-eye pixels, wherein the gate lines are grouped into a plurality of groups of gate lines, and each of the light source groups corresponds to a gate line group of the gate line groups, wherein each of the light source groups is sequentially enabled when the left-eye pixels connected to a corresponding gate line group of the gate line groups are driven in response to a voltage corresponding to the left-eye image signal by the data driver or when the right-eye pixels connected to a corresponding gate line group of the gate line groups are driven in response to a voltage corresponding to the right-eye image signal by the data driver.

12. The display apparatus of claim 11, wherein each of the light source groups is sequentially disabled when the left-eye pixels connected to the corresponding gate line group of the gate line groups are driven in response to a voltage corresponding to the low gray-scale black image signal by the data driver or when the right-eye pixels connected to the corresponding gate line group of the gate line groups are driven in response to the voltage corresponding to the low gray-scale black image signal by the data driver.

13. A method of driving a display apparatus which displays an image based on a three-dimensional image signal, the method comprising:

separating a first image signal into a left-eye image signal and a right-eye image signal;

applying the left-eye image signal to a plurality of left-eye pixels of the display apparatus during a left-eye frame and applying a black image signal corresponding to a black data to a plurality of right-eye pixels of the display apparatus during the left-eye frame;

applying the black image signal to the left-eye pixels during a right-eye frame and applying the right-eye image signal to the right-eye pixels during the right-eye frame, applying the black image signal to the left-eye pixels and the right-eye pixels during a first sub-frame between the left-eye frame and the right-eye frame; and applying the black image signal to the left-eye pixels and the right-eye pixels during a second sub-frame between the right-eye and the left-eye frame, wherein the left-eye pixels are alternately arranged with the right-eye pixels in the display apparatus in the unit of two pixels in a first direction, and wherein the left-eye pixels are alternately arranged with the right-eye pixels in the display apparatus in the unit of a predetermined number of pixels in a second direction orthogonal to the first direction.

14. The method of claim 13, further comprising:

applying a low gray-scale black image signal corresponding to a gray-scale level lower than a gray-scale level of the black data to the left-eye pixels during a first sub-frame between the left-eye frame and the right-eye frame; and applying the low gray-scale black image signal to the right-eye pixels during a second sub-frame between the right-eye frame and the left-eye frame.

15. The method of claim 14, further comprising:

applying a high gray-scale black image signal corresponding to a gray-scale level higher than the gray-scale level of the black data to the right-eye pixels during the first sub-frame; and applying the high gray-scale black image signal to the left-eye pixels during the second sub-frame.

16. The method of claim 15, further comprising:

generating the low gray-scale black image signal of a present frame based on the left-eye image signal of a previous frame or the right-eye image signal of the previous frame; and generating the high gray-scale black image signal of the present frame based on the left-eye image signal of the previous frame or the right-eye image signal of the previous frame.

* * * * *